US012245140B2

(12) United States Patent
Xu et al.

(10) Patent No.: US 12,245,140 B2
(45) Date of Patent: Mar. 4, 2025

(54) NETWORK SLICING WITH RADIO ACCESS NETWORK (RAN) SHARING

(71) Applicant: Apple Inc., Cupertino, CA (US)

(72) Inventors: Fangli Xu, Beijing (CN); Ralf Rossbach, Munich (DE); Sudeep Manithara Vamanan, Nuremberg (DE); Mona Agnel, Guildford (GB); Krisztian Kiss, Hayward, CA (US); Sarma V. Vangala, Campbell, CA (US); Naveen Kumar R Palle Venkata, San Diego, CA (US); Zhibin Wu, Los Altos, CA (US); Haijing Hu, Los Gatos, CA (US); Dawei Zhang, Saratoga, CA (US); Yuqin Chen, Beijing (CN); Huarui Liang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/440,441

(22) PCT Filed: Jan. 13, 2021

(86) PCT No.: PCT/CN2021/071386
§ 371 (c)(1),
(2) Date: Sep. 17, 2021

(87) PCT Pub. No.: WO2022/151008
PCT Pub. Date: Jul. 21, 2022

(65) Prior Publication Data
US 2023/0362798 A1    Nov. 9, 2023

(51) Int. Cl.
*H04W 48/18* (2009.01)
*H04W 48/16* (2009.01)
*H04W 84/04* (2009.01)

(52) U.S. Cl.
CPC ........... *H04W 48/18* (2013.01); *H04W 48/16* (2013.01); *H04W 84/042* (2013.01)

(58) Field of Classification Search
CPC .... H04W 48/18; H04W 48/16; H04W 84/042
See application file for complete search history.

(56) References Cited

U.S. PATENT DOCUMENTS

| 2018/0310238 A1 | 10/2018 | Opsenica et al. |
| 2018/0324602 A1 | 11/2018 | Griot et al. |

(Continued)

FOREIGN PATENT DOCUMENTS

| CN | 109951877 A | 6/2019 |
| WO | WO 2020/098954 A1 | 5/2020 |

OTHER PUBLICATIONS

International Search Report and Written Opinion of the International Searching Authority directed to related International Patent Application No. PCT/CN2021/071386, mailed Oct. 14, 2021; 9 pages.

(Continued)

*Primary Examiner* — Samina F Choudhry
(74) *Attorney, Agent, or Firm* — Sterne, Kessler, Goldstein & Fox P.L.L.C.

(57) ABSTRACT

An approach is described for a base station to generate a first message and a second message. The base station transmits the first message and the second message to a user equipment (UE). The first message is associated with a cell supported by the base station and includes a first public land mobile network (PLMN) identity index and a first list of one or more network slices supported by a first PLMN associated with the first PLMN identity index. The second message is associated with one or more neighboring cells, and includes the first PLMN identity index and a second list of one or more network slice data associated the first PLMN as supported by the one or more neighboring cells. In addition, (Continued)

at least one of the one or more network slice data in the second list includes a sub-list of one or more neighboring cell data.

20 Claims, 10 Drawing Sheets

(56) References Cited

U.S. PATENT DOCUMENTS

| | | | |
|---|---|---|---|
| 2019/0380128 A1* | 12/2019 | Park | H04W 72/29 |
| 2020/0163149 A1* | 5/2020 | Mildh | H04W 36/36 |
| 2020/0305054 A1* | 9/2020 | Zee | H04W 36/0061 |
| 2020/0322879 A1 | 10/2020 | Zhu et al. | |
| 2022/0053416 A1* | 2/2022 | Salkintzis | H04W 48/18 |

OTHER PUBLICATIONS

Nokia: Discussion on network/cell selection for specific network slice(s)', 3GPP Draft; S1-201059, 3GPP TSG-SA WG1 Meeting #89e, E-Meeting, Feb. 2020; 2 pages.

* cited by examiner

NETWORK SLICING WITH RADIO ACCESS NETWORK (RAN) SHARING

This application is a U.S. National Phase of International Application No. PCT/CN2021/071386, filed Jan. 13, 2021, which is hereby incorporated by reference in its entirety.

BACKGROUND

Field

The described aspects generally relate to an enhancement on radio access network (RAN) support of network slicing. For example, some aspects of this disclosure relate to a network slice based cell reselection.

SUMMARY

Some aspects of this disclosure relate to apparatuses and methods for implementing an enhancement on radio access network (RAN) support of network slicing for 3rd Generation Partnership Project (3GPP) release 15 (Rel-15), release 16 (Rel-16), and/or release 17 (Rel-17), and other 3GPP releases that support network slicing. For example, systems and methods are provided for implementing designs of determining a network slice of interest to a UE, determining a base station that supports the network slice of interest to the UE, and connecting to the base station.

Some aspects of this disclosure relate to a base station configured to support wireless communication within a cell. The base station includes a transceiver and a processor communicatively coupled to the transceiver. The processor circuitry is configured to generate first and second messages and transmit, using the transceiver, the first message and the second message to a user equipment (UE). The first message is associated with a cell supported by the base station and includes a first public land mobile network (PLMN) identity index and a first list of one or more network slices supported by a first PLMN associated with the first PLMN identity index. The second message is associated with one or more neighboring cells, and includes the first PLMN identity index and a second list of one or more network slice data associated the first PLMN as supported by the one or more neighboring cells. In addition, at least one of the one or more network slice data in the second list includes a sub-list of one or more neighboring cell data.

Some aspects of this disclosure relate to the base station, wherein the first message is a system information block type 1 (SIB1) message and the second message is a system information block type 4 (SIB4) message.

Some aspects of this disclosure relate to the base station, wherein the first list includes single network slice selection assistance information (S-NSSAI) for each of the one or more network slices in the first list and wherein each of the one or more network slice data in the second list further includes single network slice selection assistance information (S-NSSAI).

Some aspects of this disclosure relate to the base station, wherein each of the one or more neighboring cell data includes frequency information and the one or more neighboring cell data are ranked in the sub-list according to corresponding priorities.

Some aspects of this disclosure relate to a method of a base station. The method includes generating a first and a second messages and transmitting the first and the second messages to a user equipment (UE). The first message is associated with a cell supported by the base station and includes a first public land mobile network (PLMN) identity index and a first list of one or more network slices supported by a first PLMN associated with the first PLMN identity index. The second message is associated with one or more neighboring cells, and includes the first PLMN identity index and a second list of one or more network slice data associated the first PLMN as supported by the one or more neighboring cells. In addition, at least one of the one or more network slice data in the second list includes a sub-list of one or more neighboring cell data.

Some aspects of this disclosure relate to a method of a base station, wherein the first message is a system information block type 1 (SIB1) message and the second message is a system information block type 4 (SIB4) message.

Some aspects of this disclosure relate to a method of a base station, wherein the first list includes single network slice selection assistance information (S-NSSAI) for each of the one or more network slices in the first list and wherein each of the one or more network slice data in the second list further includes single network slice selection assistance information (S-NSSAI).

Some aspects of this disclosure relate to a method of a base station, wherein each of the one or more neighboring cell data includes frequency information and the one or more neighboring cell data are ranked in the sub-list according to corresponding priorities.

Some aspects of this disclosure relate to a user equipment (UE). The UE includes a transceiver configured to communicate with a base station and a processor communicatively coupled to the transceiver. The processor is configured to determine a public land mobile network (PLMN) serving the UE and a network slice of interest. The processor is also configured to receive, using the transceiver, a first message and a second message, wherein the first message is associated with a cell and includes a public land mobile network (PLMN) identity index associated with a PLMN and a first list of one or more network slices, wherein the second message is associated with one or more neighboring cells and includes the PLMN identity index, a second list of one or more network slice data, and wherein at least one of the one or more network slice data in the second list includes a sub-list of one or more neighboring cell data. The processor is also configured to determine at least based on the first message that the network slice of interest is not supported by the PLMN in the cell and determine at least based on the second message, neighboring cell data associated with the network slice of interest and the PLMN. The processor is further configured to establish, using the transceiver, a communication link with a neighboring cell of the one or more neighboring cells at least based on the neighboring cell data and transmit, using the transceiver, a request to the neighboring cell to access the network slice of interest.

Some aspects of this disclosure relate to the UE, wherein the first message is a system information block type 1 (SIB1) message and the second message is a system information block type 4 (SIB4) message.

Some aspects of this disclosure relate to the UE, wherein the processor is further configured to determine at least based on the first message that the network slice of interest is not supported by determining that the network slice of interest is not in the first list of one or more network slices.

Some aspects of this disclosure relate to the UE, wherein the processor is further configured to determine at least based on the second message the neighboring cell data associated with the network slice of interest and the PLMN by determining that the PLMN identity index corresponds to the PLMN; determining that the at least one of the one or more network slice data includes single network slice selection assistance information (S-NSSAI) corresponding to the network slice of interest, and determining that the neighboring cell data is in the sub-list.

Some aspects of this disclosure relate to a method. The method includes determining a public land mobile network (PLMN) serving a UE, wherein the UE connects to a cell and an network slice of interest. The method includes receiving a first message and a second message, wherein the first message is associated with the cell and includes a public land mobile network (PLMN) identity index and a first list of one or more network slices, wherein the second message is associated with one or more neighboring cells and includes the PLMN identity index, a second list of one or more network slice data, and wherein at least one of the one or more network slice data in the second list includes a sub-list of one or more neighboring cell data. The method also includes determining at least based on the first message that the network slice of interest is not supported by the PLMN in the cell and determining at least based on the second message, neighboring cell data associated with the network slice of interest and the PLMN. The method further includes establishing a communication link with a neighboring cell of the one or more neighboring cells at least based on the neighboring cell data and transmitting a request to the neighboring cell to access the network slice of interest.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
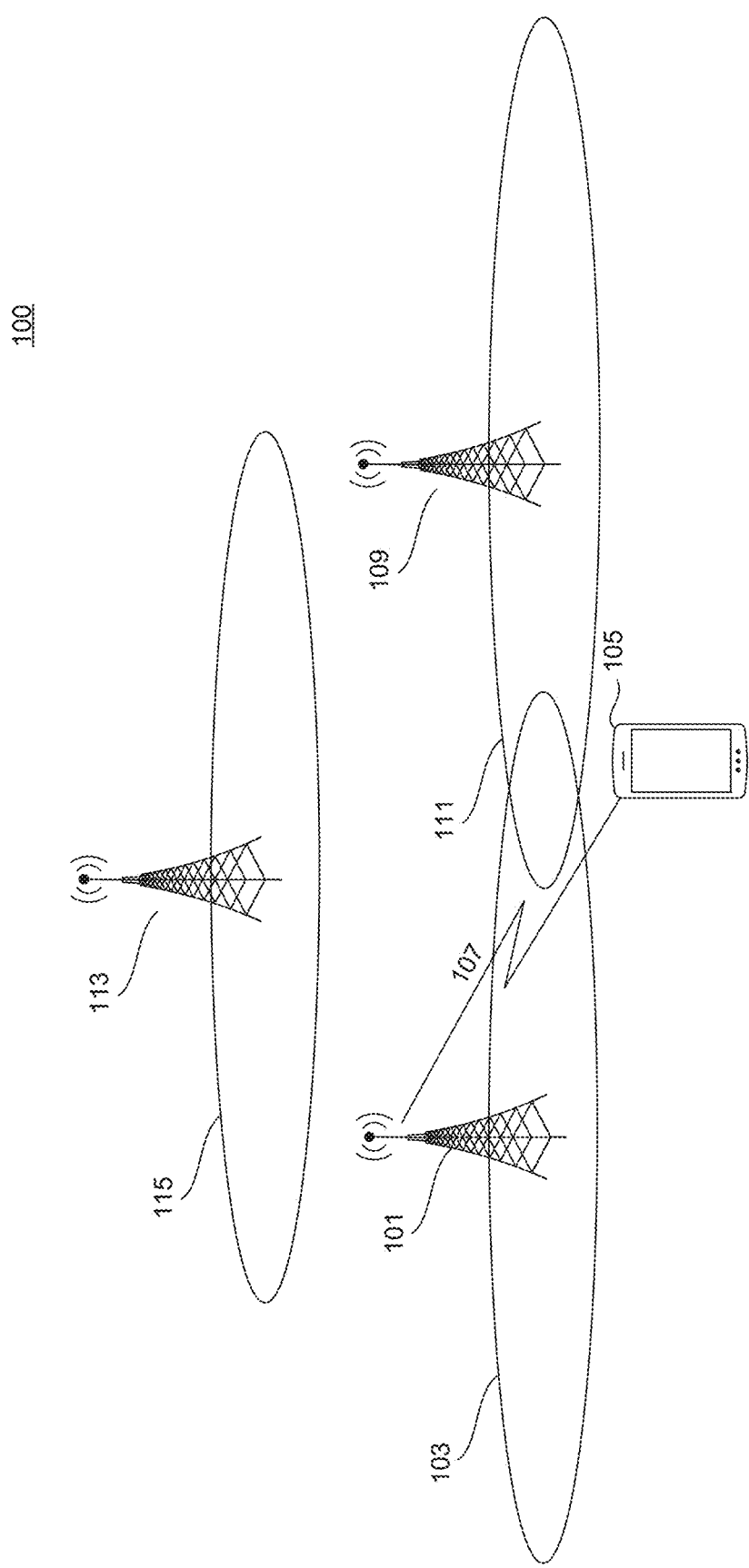
FIG. 1 illustrates an example system implementing radio access network (RAN) support of network slicing, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing enhancement of radio access network (RAN) support of network slicing for 3rd Generation Partnership Project (3GPP) release 15 (Rel-15), release 16 (Rel-16), and/or release 17 (Rel-17), and other 3GPP releases that support network slicing. For example, systems and methods are provided for implementing designs for determining a network slice of interest to a UE, determining a base station that supports the network slice of interest to the UE, and connecting to the base station.

According to some aspects, a base station that operates according to Release 15 (Rel-15), Release 16 (Rel-16), and/or Release 17 (Rel-17) New Radio (NR) of $5^{th}$ generation (5G) wireless technology for digital cellular networks as defined by 3rd Generation Partnership Project (3GPP) may support one or more cells that provide services to a user equipment (UE). For example, the base station may support a first cell and a second cell. Each of the one or more cells may support one or more public land mobile networks (PLMNs). In some aspects, the first and second cells may support different PLMNs. For example, the first cell may support a PLMN 1 and a PLMN 2. While the second cell may support the PLMN 1 and a PLMN 3. The UE may determine the PLMN 2 to be its serving operator and therefore may connect to the first cell. In some aspects, the one or more cells may support same PLMNs. For example, the first and the second cell may both support the PLMN 1 and the PLMN 2. The UE may determine the PLMN 2 to be its serving operator and therefore may connect to either the first cell or the second cell.

According to some aspects, the UE may have the PLMN 3 as its serving operator and may connect to the first cell via the base station. The UE may receive system information from the base station to determine the PLMNs that are supported in the first cell. For example, the UE may receive a system information block type 1 (SIB1) message from the base station and determine based on the SIB1 message that the PLMN 3 is not supported in the first cell. In such a case, the UE may perform a cell reselection. For example, the UE may receive SIB1 messages from neighboring cells to determine supporting PLMNs of the neighboring cells. The UE may receive a SIB1 message from a third cell via a second base station and may determine that the PLMN 3 is supported by the third cell. The UE may subsequently establish communications with the third cell via the second base station. In some aspects, the first cell may operate on a first frequency and the third cell may operate on a second frequency. In other aspects, the first cell and the third cell may both operate on the first frequency.

According to some aspects, the UE may have the PLMN 3 as its serving operator and may connect to the first cell via the base station. The UE may move away from the base station because a user of the UE moves away from the base station. The UE may determine that a signal power level from the base station is lower than a threshold. For example, the UE may detect a reference signals received power (RSRP) and may determine that the RSRP is below a power level threshold, wherein the power level threshold may be required to maintain communications between the base station and the UE. In such a case, the UE may perform a cell reselection or a hand over. The UE may measure signal strength of neighboring cells and select a neighboring cell with a strongest signal strength. For example, the UE may determine that the third cell supported by the second base station has the strongest signal strength. Similar as discussed above, the UE may receive the SIB1 message regarding the third cell and determine that the PLMN 3 is supported by the third cell. The UE may subsequently establish communications with the third cell via the second base station.

According to some aspects, the UE may have the PLMN 3 as its serving operator and may connect to the first cell via the base station. The UE may determine that the PLMN 3 is not supported by the first cell at least based on the SIB1 message received from the first cell as discussed above. In such a case, the UE may perform a cell reselection. In some aspects, the UE may receive system information regarding neighboring cells from the base station. For example, the UE may receive a system information block type 4 (SIB4) message from the base station. The SIB4 message may include neighboring cell data regarding the PLMNs. For example, the SIB4 message may include neighboring cell data regarding the PLMN 3. The neighboring cell data may be frequency information. In some aspects, the SIB4 message may indicate that cells that operate on the second frequency support the PLMN 3. In some examples, the third cell supported by the second base station may operate on the second frequency. The UE may detect the third cell on the second frequency and establish communications with the third cell via the second base station.

According to some aspects, multiple cells may operate on the second frequency. For example, a fourth cell supported by a third base station may operate on the second frequency as well. Thus, the UE may detect both the third and the fourth cells on the second frequency. The UE may select a cell with a stronger signal strength to connect. For example, the UE may detect signal strength received from the third and the fourth cell. The UE may determine that the signal strength of the third cell is stronger and may connect to the third cell via the second base station.

According to some aspects, the neighboring cell data may include a plurality of frequency information. For example, the neighboring cell data may include the second frequency and a third frequency. In such a case, the neighboring cell data indicates that cells operating on either the second or the third frequency support the PLMN 3. The neighboring cell data may rank the second and the third frequency in an order. For example, the second frequency may rank higher than the third frequency. The order may be based on priorities of the first and the third frequencies. The UE may determine to establish communications with cells based on ranks of the neighboring cell data. For example, the UE may determine to establish communications with the cells operating on a frequency that ranks the highest in the neighboring cell data. For example, the UE may determine to connect to cells operating on the second frequency.

In some aspects, cells operating on the highest ranked frequency may not be available. For example, the third cell operating on the second frequency may reach their system capacities, e.g., a number of UEs that connect to the third cell is greater than or equal to a maximum number of UEs that the third cell is able to support. In such a case, the UE may determine to establish communications with the cell operating on a second highest ranked frequency, e.g., the third frequency.

According to some aspects, the base station may support one or more network slices. Each network slice may provide a service to the UE. For example, the one or more network slices may include enhanced mobile broadband (eMBB) services, ultra-reliable and low-latency communication (URLLC) services, massive machine-type communication (mMTC) service, or any other type of services. In some aspects, each network slice may correspond to a quality of service (QoS). For example, a network slice of eMBB service may have high data rates and high traffic volumes. A network slice of the URLLC service may have low error rates/packet loss rates and low latencies. A network slice of the eMTC service may have low power consumption rates and a high connection capacity.

According to some aspects, the one or more network slice may be PLMN-specific and cell-specific. For example, the base station may provide services of a network slice 1 and a network slice 2 in the first cell for the PLMN 1. The base station may also provide services of the network slice 1 and a network slice 3 in the first cell for the PLMN 2. The UE may have the PLMN 1 as its serving operator. In such a case, the UE may have access to the network slice 1 and the network slice 2 when connecting to the first cell via the base station. In contrast, if the UE have the PLMN 2 as its serving operator, the UE may have access to the network slice 1 and the network slice 3 when connecting to the second cell via the base station. In other words, a cell may support different network slices for different PLMNs.

According to some aspects, the UE may have the PLMN 1 as its serving operator and may connect to the first cell via the base station. The UE may determine that a network slice of interest to the UE is the network slice 3. Similar to discussion above, the UE may receive system information regarding the first cell from the base station. For example, the UE may receive the SIB1 message from the base station. The SIB1 message may indicate that the first cell supports the network slice 1 and the network slice 2 for the PLMN 1. Therefore, the UE may determine that the network slice of interest to the UE, e.g., the network slice 3, is not supported by the first cell for PLMN 1. In such a case, the UE may perform a cell reselection to connect to a cell that supports the network slice of interest for the PLMN 1. The UE may receive SIB1 messages from the neighboring cells to determine which the neighboring cells supports the network slice of interest for PLMN 1. For example, the UE may receive an SIB1 message from the third cell via the second base station and determine that the PLMN 1 is supported by the third cell. The UE may also determine at least based on the SIB1 message received from the third cell that the network slice 3 is supported by the third cell for PLMN 1. The UE may subsequently establish communications with the third cell via the second base station. In some aspects, the first cell may operate in the first frequency and the third cell may operate in the second frequency. In other aspects, the first cell and the third cell both operate on the first frequency.

According to some aspects, the UE may have the PLMN 1 as its serving operator and may connect to the first cell via the base station. Similar to discussion above, the UE may determine that the network slice of interest to the UE is the network slice 3. The UE may move away from the base station. The UE may determine that a signal power level of the base station is lower than a threshold. For example, the UE may detect a reference signal received power (RSRP) and determine that the RSRP is below a power level threshold, wherein the power level threshold may be required to maintain communications between the base station and the UE. The UE may measure signal strength of neighboring cells and select a neighboring cell with a strongest signal strength. For example, the UE may determine that the third cell of the second base station has a strongest signal strength. In such a case, the UE may receive a SIB1 message from the third cell and determine that the network slice 3 is supported by the third cell for the PLMN 1. The UE may subsequently establish communications with the third cell via the second base station.

According to some aspects, the UE may have the PLMN 1 as its serving operator and may connect to the first cell via the base station. The UE may determine that a network slice of interest to the UE is network slice 3. The UE may determine that the network slice 3 is not supported in the first cell for the PLMN 1 at least based on the SIB1 message received from the base station as discussed above. In some aspects, the UE may receive system information regarding neighboring cells from the base station. For example, the UE may receive a system information block type 4 (SIB4) message from the base station. The SIB4 message may include neighboring cell data regarding the PLMNs and supported network slices. For example, the SIB4 message may include neighboring cell data that indicate cells that support network slice 3 for the PLMN 1. The neighboring cell data may be frequency information. For example, the SIB4 message may indicate that cells that operate on the second frequency support the network slice 3 for PLMN 1. In some examples, the third cell of the second base station may operate on the second frequency. The UE may detect the third cell on the second frequency and establish communications with the third cell via the second base station.

According to some aspects, the neighboring cell data may include information regarding a plurality of frequencies. For example, the neighboring cell data may include the second frequency and a third frequency. The neighboring cell data may rank the second and the third frequencies in an order. For example, the second frequency may rank higher than the third frequency. The order may be based on priorities of the second and the third frequencies. The UE may determine to establish communications with cells operating on a frequency that ranks the highest in the neighboring cell data. For example, the UE may determine to connect to cells operating on the second frequency.

In some aspects, cells operating on the highest ranked frequency may not be available. For example, the third cell operating on the second frequency may reach its system capacities, e.g., a number of UEs that connect to the third cell is greater than or equal to a maximum number of UEs that the third cell is able to support. In such a case, the UE may determine to establish communications with the cell operating on a second highest ranked frequency, e.g., the third frequency.

FIG. 1 illustrates an example system 100 implementing designs of New Radio (NR) radio access network (RAN) support of network slicing, according to some aspects of the disclosure. Example system 100 is provided for the purpose of illustration only and does not limit the disclosed aspects. System 100 may include, but is not limited to, a base station 101, such as a gNB, and an electronic device, represented as a UE 105. The UE 105 may be implemented as an electronic device configured to operate based on a wide variety of wireless communication techniques. These techniques may include, but are not limited to, techniques based on 3rd Generation Partnership Project (3GPP) standards. For example, the UE 105 may include an electronic device configured to operate using one or more 3GPP releases, such as Release 15 (Rel-15), Release 16 (Rel-16), or Release 17 (Rel-17) or other 3GPP releases. The UE 105 may include, but is not limited to, wireless communication devices, smart phones, laptops, desktops, tablets, personal assistants, monitors, televisions, wearable devices, Internet of Things (IoT) devices, vehicle communication devices, and the like. The base station 101 may include one or more nodes configured to operate based on a wide variety of wireless communication techniques such as, but not limited to, techniques based on 3GPP standards. For example, the base station 101 may include nodes configured to operate using Rel-15, Rel-16, Rel-17, or other 3GPP releases. In some aspects, the base station 101 may support a cell 103. The UE 105 may connect to the cell 103 via the base station 101. The base station 101 may communicate with the UE 105 via one or more communication links 107. The one or more communication links 107 may include an uplink (UL) and a downlink (DL). The system 100 may further include a base station 109 that supports a cell 111, wherein the cell 103 and the cell 111 may partially overlap. The system 100 may further include a base station 113 that supports a cell 115.

According to some aspects, the cell 103 may support a PLMN 1 and a PLMN 2, the cell 111 may support the PLMN 1 and the PLMN 2, and the cell 115 may support the PLMN 2. The UE 105 may determine its serving operating to be the PLMN 1. For example, the UE may determine its operator to be the PLMN 1 at least based on an international mobile subscriber identity (IMSI) of the UE 105. The UE 105 may receive system information from the base station 101 regarding the supported PLMNs of the cell 103. For example, the UE 105 may receive an SIB1 message from the base station 101. The SIB1 message may indicate that cell 103 of the base station 101 supports PLMN 1 and PLMN 2. In some aspects, the SIB1 message includes information corresponding to a current connecting cell or a local cell. For example, the SIB1 message received by the UE 105 from the base station 101 when connecting to the cell 103 includes the information of the cell 103. In such a case, the current connecting cell or the local cell is the cell 103.

According to some aspects, the UE 105 may move away from the base station 101 because a user of the UE 105 moves away from the base station 101. The UE 105 may determine that a signal power level from the base station 101 is lower than a threshold. For example, the UE 105 may detect a reference signal received power (RSRP) and determine that the RSRP is below a power level threshold, wherein the power level threshold may be required to maintain communications between the base station 101 and the UE 105. In such a case, the UE 105 may measure signal strength of neighboring cells, such as the cell 111 and the cell 115, and select a neighboring cell with a strongest signal strength. For example, the UE 105 may measure the signals received from the base station 113 and the base station 109. The UE 105 may determine that the signal from the base station 109 has a higher signal strength. The UE 105 may determine that the cell 111 to be a potential cell to connect. Subsequently, the UE 105 may receive, from the base station 109, a second SIB1 message, which indicates that the cell 111 supports the PLMN 1 and the PLMN 2. Because the operator of the UE 105 is the PLMN 1, the UE 105 may determine to establish communications with the cell 111 via the base station 109 in order to take advantage of the higher signal strength and access services from PLMN 1.

According to some aspects, the UE 105 may determine that the signal from the base station 113 has a higher signal strength compared with the signal from the base station 109.

The UE may receive, from the base station 113, a third SIB1 message, which indicates that the cell 115 supports the PLMN 2 only. Because the operator of the UE 105 is the PLMN 1, the UE 105 may determine that the cell 115 is not a suitable cell to connect. Subsequently, the UE may receive the second SIB1 message from the base station 109 and determine, at least based the second SIB1 message, to connect to the cell 111 via the base station 109.

According to some aspects, the cell 103 may support different network slices for different PLMNs. For example, the cell 103 may support a network slice 1 and a network slice 2 for the PLMN 1 and a network slice 3 and a network slice 4 for the PLMN 2. In other words, the PLMN 1 and PLMN 2 share a frequency of the cell 103, but support different network slices. In some aspect, the cell 103 may support same network slices for different PLMNs. For example, the cell 103 may support the network slice 1 and 2 for both the PLMN 1 and the PLMN 2. In other words, the PLMN 1 and the PLMN 2 share the frequency of the cell 103 and support the same network slices 1 and 2. In some aspects, the shared frequency of the cell 103 is 700 MHz.

Figure 2:
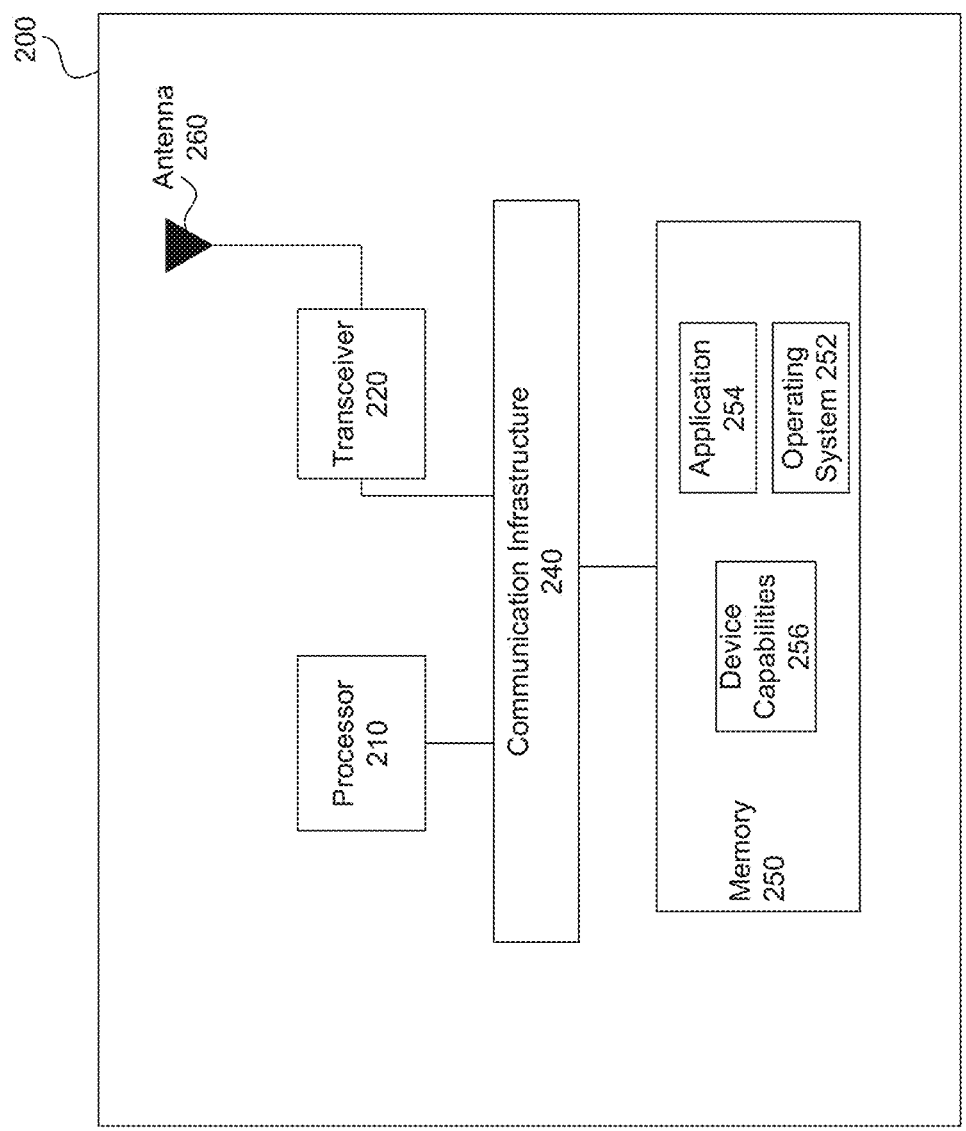
FIG. 2 illustrates a block diagram of an example system of an electronic device for the radio access network (RAN) support of network slicing, according to some aspects of the disclosure.

FIG. 2 illustrates a block diagram of an example system 200 of an electronic device implementing mechanisms for designs of radio access network (RAN) support of network slicing, according to some aspects of the disclosure. The system 200 may be any of the electronic devices (e.g., a base station 101, 109, 113, and an UE 105) of the system 100. The system 200 includes a processor 210, one or more transceivers 220, a communication infrastructure 240, a memory 250, an operating system 252, an application 254, and one or more antennas 260. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, Siri™, FaceTime™, radio streaming, video streaming, remote control, and/or other user applications.

The system 200 may also include the communication infrastructure 240. The communication infrastructure 240 provides communication between, for example, the processor 210, the one or more transceivers 220, and the memory 250. In some implementations, the communication infrastructure 240 may be a bus. The processor 210, alone or together with instructions stored in the memory 250 performs operations enabling system 200 of the system 100 to implement mechanisms for the RAN support of network slicing, as described herein.

The one or more transceivers 220 transmit and receive communications signals support mechanisms for the RAN support of network slicing. Additionally, the one or more transceivers 220 transmit and receive communications signals that support mechanisms for measuring communication link(s), generating and transmitting system information, and receiving the system information. According to some aspects, the one or more transceivers 220 may be coupled to antenna 260. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

According to some aspects of this disclosure, the processor 210, alone or in combination with computer instructions stored within the memory 250, and/or the one or more the transceiver 220, implements the methods and mechanisms discussed in this disclosure. For example, the processor 210, alone or in combination with computer instructions stored within the memory 250, and/or the one or more transceiver 220, implements mechanisms for the RAN support of network slicing. According to some aspects of this disclosure, the processor 210, alone or in combination with computer instructions stored within the memory 250, may determine supported PLMNs for the cell 103 of the base station 101. The processor 210, alone or in combination with computer instructions stored within the memory 250, may generate a message including PLMN information for the cell 103. For example, the message may be an SIB1 message. In some aspects, the processor 210, alone or in combination with computer instructions stored within the memory 250, may determine network slices supported in the cell 103 of the base station 101 for each of the PLMNs. In some aspects, the processor 210, alone or in combination with computer instructions stored within the memory 250, may generate the message including network slice information per PLMN for the cell 103 of the base station 101. For example, the message may be the SIB1 message.

According to some aspects of this disclosure, the processor 210, alone or in combination with computer instructions stored within the memory 250, may determine supported PLMNs for neighboring cells, such as the cell 111 of the base station 109 and the cell 115 of the base station 113. The processor 210, alone or in combination with computer instructions stored within the memory 250, may generate a second message including PLMNs information for the cell 111 and the cell 115. For example, the second message may be an SIB4 message. In some aspects, the processor 210, alone or in combination with computer instructions stored within the memory 250, may determine network slices supported in the neighboring cells, such as the cell 111 and the cell 115, for each of the PLMNs. In some aspects, the processor 210, alone or in combination with computer instructions stored within the memory 250, may generate the second message including network slice information per PLMN for the cell 111 and the cell 115. For example, the message may be the SIB4 message.

As discussed in more detail below with respect to FIGS. 3-9, processor 210 may implement different mechanisms for the RAN support of network slicing as discussed with respect to the system 100 of FIG. 1.

Figure 3:
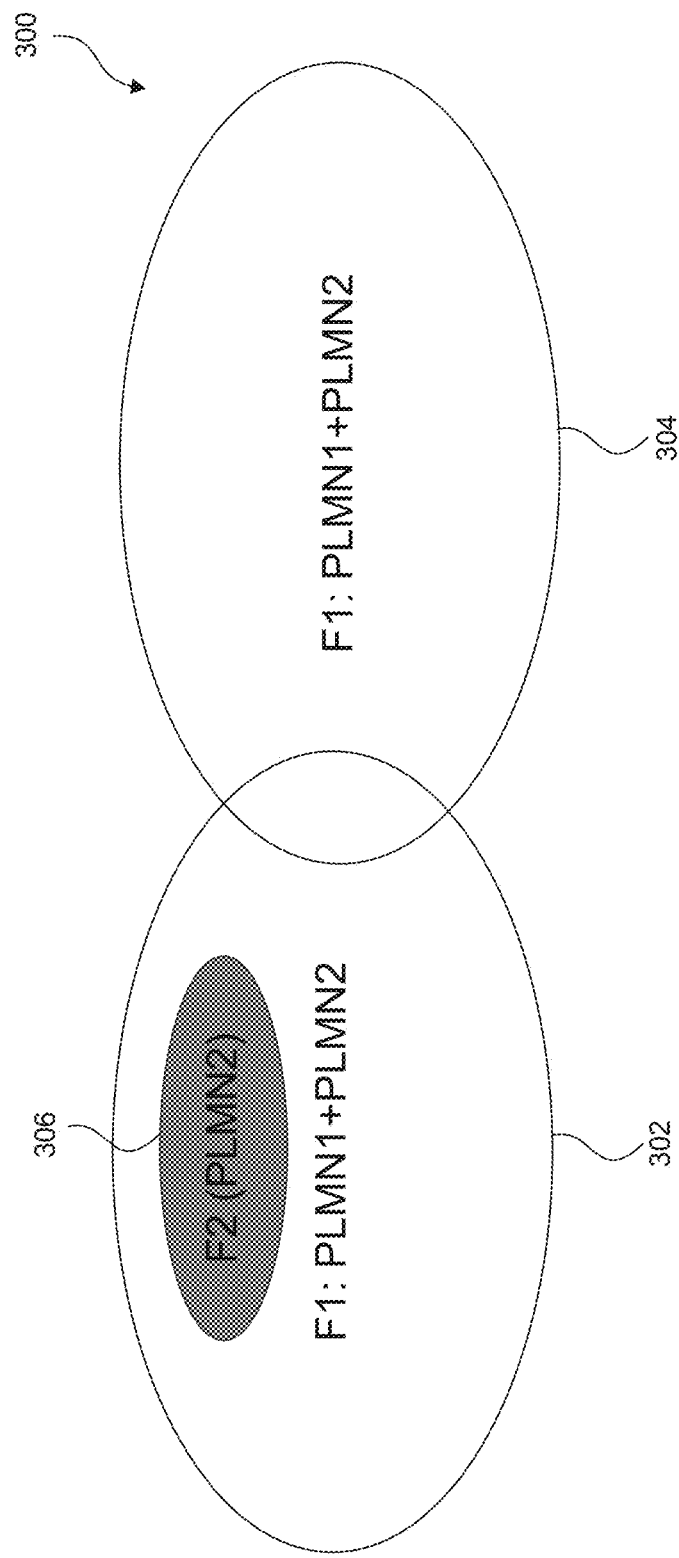
FIG. 3 illustrates an example of cell distribution according aspects of the disclosure.

FIG. 3 illustrates an example of cell distribution. Example system 300 is provided for the purpose of illustration only and does not limit the disclosed aspects. System 300 may include, but is not limited to, a cell 302, a cell 304, and a cell 306. The cell 302 and the cell 304 may support the PLMN 1 and the PLMN 2. In contrast, the cell 306 may support the PLMN 2. The cell 302 and the cell 304 may partially overlap and may operate on a frequency F1. The cell 306 may be within the range of the cell 302 and may operate on a frequency F2.

According to some aspects, the UE 105 may determine to connect to a cell that operates on the frequency F1 when performing a cell reselection. Because both the cell 302 and the cell 304 operate on the frequency F1, the UE 105 may compare signal strength of the cell 302 and the cell 304 and connect to a cell having a higher signal strength. For example, the UE 105 may determine that signals receive from the cell 302 has a higher signal strength and connect to the cell 302. In some aspects, the UE 105 may locate in an intersection area of the cell 302 and the cell 304, the signal strength of the cell 302 and the cell 304 may be similar. In such a case, the UE 105 may connect to either the cell 302 or the cell 304.

According to some aspects, the UE 105 may have the PLMN 2 as its serving operator and may connect to the cell 306. The UE 105 may move away from the cell 306 and closer to the cell 304. The UE 105 may determine that the signal strength of the cell 304 is stronger than the signal strength of the cell 306. Because the serving operating of the UE 105 is the PLMN 2, the UE 105 may determine whether the cell 304 support the PLMN 2. In some aspects, the UE 105 may receive system information from the cell 304 and determine that the cell 304 supports the PLMN 2. For example, the UE 105 may receive an SIB1 message from the cell 304 on the frequency F1 and determine that the cell 304 supports the PLMN 2 at least based on the SIB1 message. In some aspects, the UE 105 may receive system information regarding neighboring cells from the cell 306 and determine that the cell 304 support the PLMN 2. For example, the UE 105 may receive an SIB4 message from the cell 306 and determines that the cell 304 supports the PLMN 2 at least based on the SIB4 message.

Figure 4:
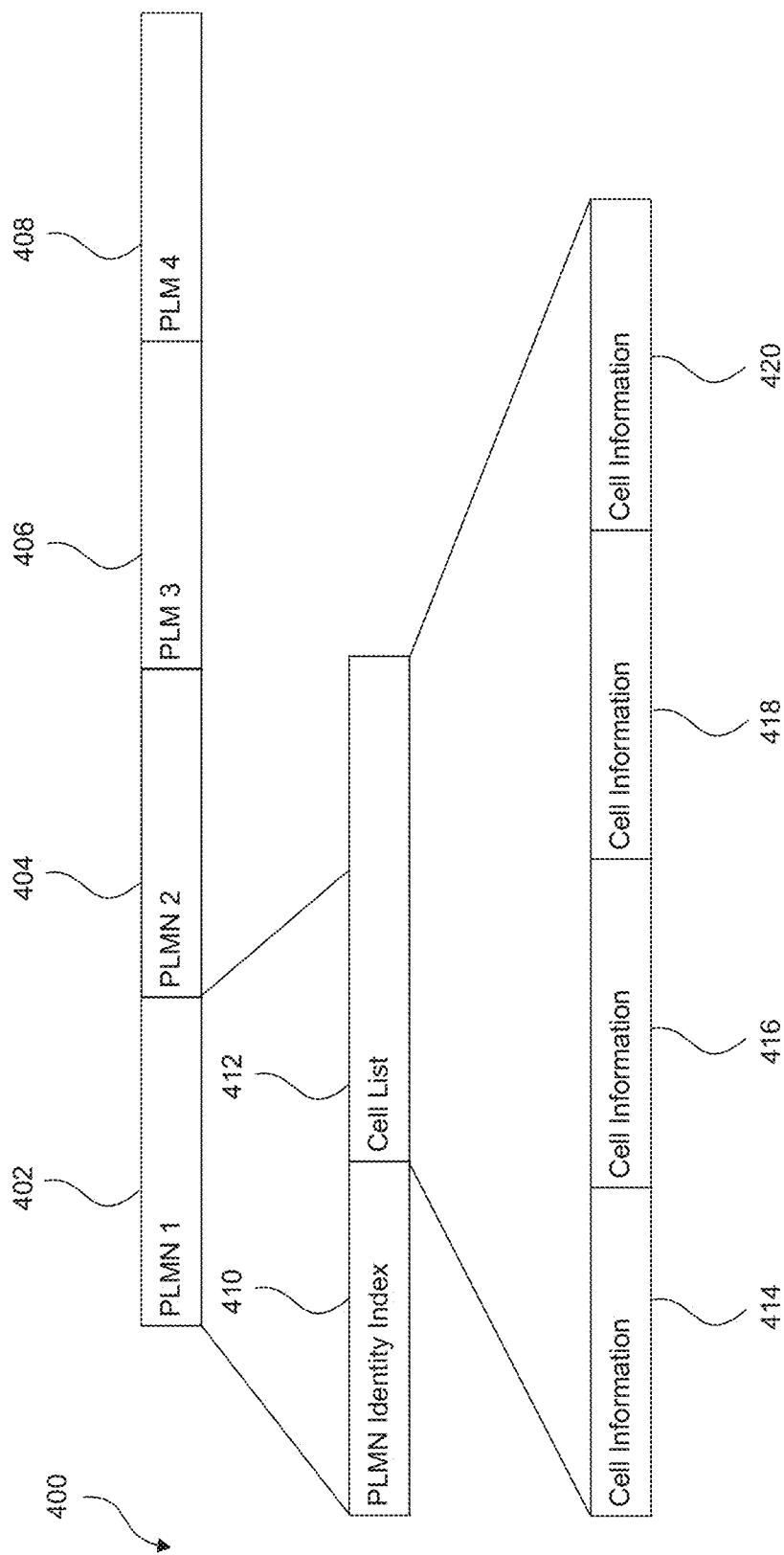
FIG. 4 illustrates an example of neighboring cells information according aspects of the disclosure.

FIG. 4 illustrates an example of neighboring cells information. According to some aspects, the neighboring cells information 400 may also be referred to as neighboring cells system information, a per-PLMN cell reselection data, or an SIB4 message. The neighboring cells information 400 may include, but is not limited to, PLMN 1 data 402, PLMN 2 data 404, PLMN 3 data 406, and PLMN 4 data 408. In some aspects, the PLMN 1 data 402 may include a PLMN identity index 410 and a cell list 412. The PLMN identity index 410 may be a sequence of digits identifying the PLMN 1. For example, the PLMN identity index 410 may be a five-digit or six-digit number corresponding to the PLMN 1. The cell list 412 may include information of cells that support the PLMN 1. The cell list 412 may include, but is not limited to, cell information 414, 416, 418, and 420. Each of the cell information 414, 416, 418, and 420 may include a frequency associated with one or more cells that support the PLMN 1. For example, the cell information 414 may include a first frequency indicating that cells operating on the first frequency support the PLMN 1. Likewise, the cell information 416 may include a second frequency indicating that cells operating on the second frequency support the PLMN 1. In some aspects, the cell information 414, 416, 418 and 420 are ranked at least based on priorities. For example, the cell information 414 may have a highest priority and therefore ranks the highest.

Referring back to FIG. 3, the UE 105 may receive the neighboring cells information 400 of the cell 306, to which the UE 105 connects. Because the cell 302 and the cell 304 are neighboring cells of the cell 306, the neighboring cells information 400 may include information of the cell 302 and the cell 306. For example, because the cell 302 and the cell 304 both support the PLMN 1, information of the cell 302 and the cell 304 may be in the cell list 412, which is part of the PLMN 1 data 402. In some aspects, the cell information 414 of the cell list 412 may include frequency information of the cell 302 and the cell 304. For example the first frequency in the cell information 414 may be the frequency F1.

According to some aspect, the UE 105 may determine that its serving operator is the PLMN 1, which is not supported in the cell 306. The UE 105 may detect, at least based on the neighboring cells information 400 shown in the FIG. 4, the cell information 414 that indicates the frequency information of the cells supporting the PLMN 1. For example, the UE 105 may determine at least based on the cell information 414 to connect to the cells operating on the first frequency. The UE may determine to connect to the cell 302 that operates on the first frequency. In other aspects, the UE 105 may determine that no cell operating on the first frequency is available. For example, the UE 105 may determine that both the cell 302 and the cell 304 are not available. The UE 105 may detect other cells that support the PLMN 1. For example, the cell information 416 may include a second frequency and indicate that neighboring cells operating on the second frequency support the PLMN 1. The UE 105 may determine to connect to the neighboring cells on the second frequency at least based on the cell information 416.

Figure 5:
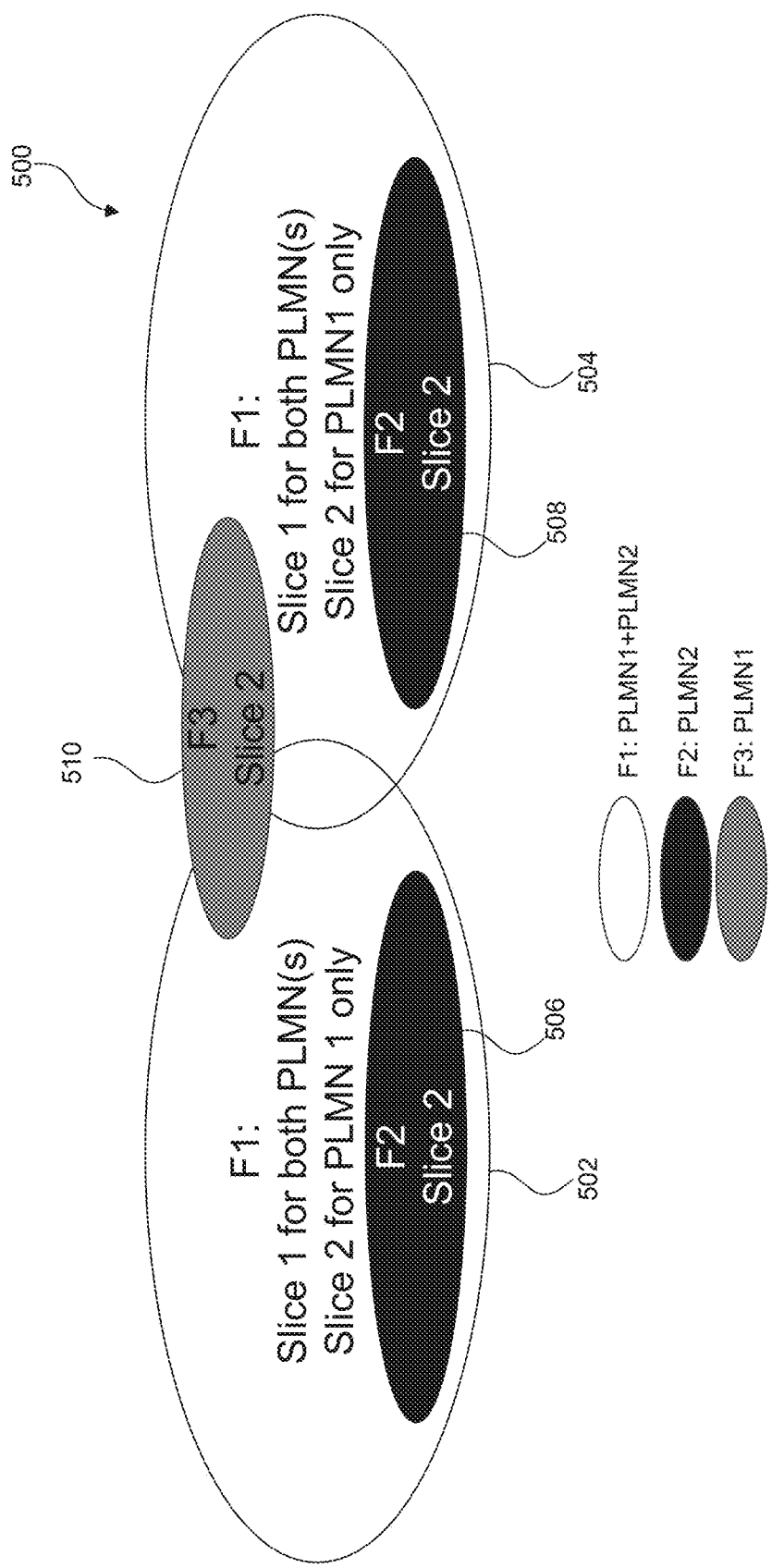
FIG. 5 illustrates an example of cell distribution with network slices according aspects of the disclosure.

FIG. 5 illustrates an example of cell distribution with network slices. Example system 500 is provided for the purpose of illustration only and does not limit the disclosed aspects. System 500 may include, but is not limited to, a cell 502, a cell 504, a cell 506, a cell 508, and a cell 510. The cell 502 and the cell 504 may operate on a frequency F1 and support the PLMN 1 and the PLMN 2. The cell 506 and the cell 508 may operate on a frequency F2 and support the PLMN 2. The cell 510 may operate on a frequency F3 and support the PLMN 1. The cell 502 and the cell 504 may support a network slice 1 for the PLMN 1 and the PLMN 2. For example, when connecting to the cell 502 and 504, the UE 105 may access the network slice 1 if the serving operator of the UE 105 is the PLMN 1 or the PLMN 2. The cell 502 and the cell 504 may support a network slice 2 for the PLMN 1. For example, when connecting to the cells 502 or 504, the UE 105 may access the network slice 2 if the serving operator of the UE 105 is the PLMN 1. In contrast, the UE 105 may not have an access to the network slice 2 in the cell 502 or the cell 504 if the serving operator of the UE 105 is the PLMN 2.

According to some aspects, the UE 105 of the PLMN 2 may connect to the cell 502. The UE 105 may receive system information from the cell 502 regarding the neighboring cells. For example, the UE 105 may receive an SIB4 message from the cell 502. The SIB4 message may include cell information corresponding a network slice for each PLMN. The SIB4 message may indicate that cells operating on the frequency F2 have higher priorities for the network slice 2 service if the operator of the UE 105 is the PLMN 2. Because the UE 105 currently connects to the cell 502, which operates on the frequency F1, if the UE 105 requires the network slice 2 service, the UE 105 may perform a cell reselection and connect to the cell 506 or the cell 504.

According to some aspects, the operator of the UE 105 may be the PLMN 1 and the UE 105 connects to the cell 502. The UE 105 may require the network slice 2 service. The UE 105 may determine, at least based on the SIB4 message received from the cell 502, that the cells operate on the frequency F3 have higher priorities for the network slice 2. The UE 105 may perform a cell reselection and connect to the cell 510, which operates on the frequency F3. In other aspects, the UE 105 may determine, at least based on the SIB4 message received from the cell 502, that the cells operate on the frequency F1 have higher priorities for the network slice 2. The UE 105 may remain connected to the cell 502, which operates on the frequency F1.

As shown in the FIG. 5, the cell 502, 504, and 510 all support the network slice 2 for the PLMN 1. In some aspects, the cell 510 has a higher priority because the cell 510 is a dedicated cell for the network slice 2. In contrast, the cell 502 and 504 support both of the network slice 1 and 2 for the PLMN 1. In some aspects, the cell 510 has the higher priority because the cell 510 is a dedicated cell for the PLMN 1. While the cell 502 and 504 support both the PLMN 1 and the PLMN 2.

According to some aspects, the operator of the UE 105 may be the PLMN 1 or the PLMN 2, and the UE 105 connects to the cell 502. The UE 105 may require the network slice 1 service. The UE 105 may determine, at least based on the SIB4 message received from the cell 502, that the cells operate on the frequency F1 have higher priorities for the network slice 1. Because the UE 105 already connects to the cell 502, which operates on the frequency F1, the UE 105 may stay connected to the cell 502.

According to some aspects, the operator of the UE 105 may be the PLMN 1 and the UE 105 connects to the cell 510. The UE 105 may require the network slice 1 service. The UE 105 may determine, at least based on the SIB4 message received from the cell 502, that the cells operate on the frequency F1 have higher priorities for the network slice 1. The UE 105 may perform a cell reselection and connect to the cell 502 or the cell 504, which operates on the frequency F.

According to some aspects, the operator of the UE 105 may be the PLMN 1 and the UE 105 connects to the cell 510. The UE 105 may require the network slice 2 service. The UE 105 may determine, at least based on the SIB4 message received from the cell 510, that the cells operate on the frequency F3 have higher priorities for the network slice 2. Because the UE 105 already connects to the cell 510, which operates on the frequency F3, the UE 105 may stay connected to the cell 510.

Figure 6:
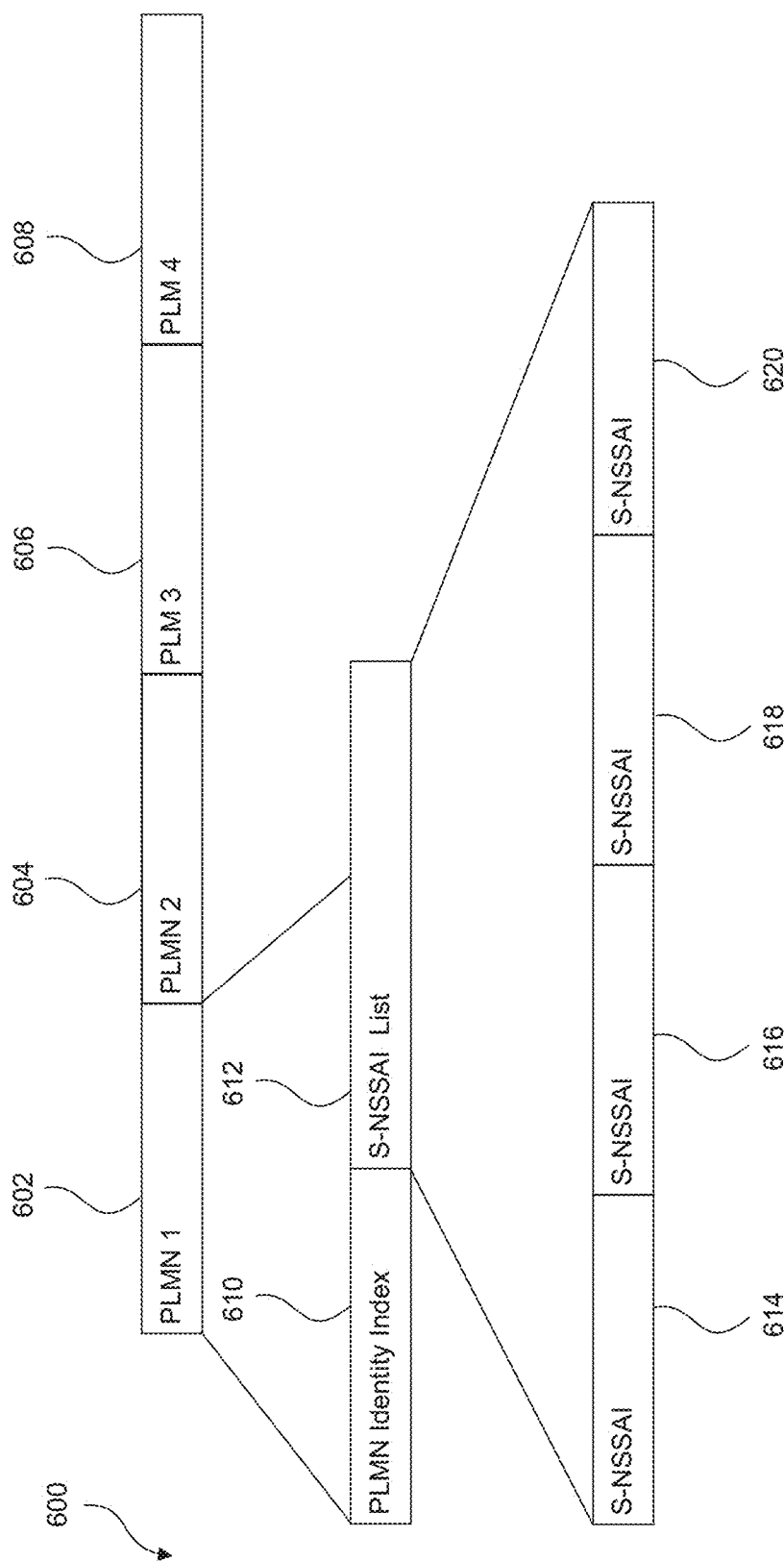
FIG. 6 illustrates an example of local cell information according aspects of the disclosure.

FIG. 6 illustrates an example of local cell information. According to some aspects, the local cell information 600 may also be referred to as local cell system information, per PLMN slice information, or an SIB1 message. The local cell information 600 may include, but is not limited to, PLMN 1 data 602. PLMN 2 data 604, PLMN 3 data 606, and PLMN 4 data 608. In some aspects, the PLMN 1 data 602 may include a PLMN identity index 610 and a single network slice selection identifier (S-NSSAI) list 612. The PLMN identity index 610 may be a sequence of digits identifying the PLMN 1. For example, the PLMN identity index 610 may be a five-digit or six-digit number corresponding to the PLMN 1. The S-NSSAI list 612 may include information of network slices that are supported by a cell for the PLMN 1. For example, the local cell information 600 may be received by the UE from the cell 502. The S-NSSAI list 612 may indicate network slices that are supported by the cell 502 for the PLMN 1. The S-NSSAI list 612 may include, but is not limited to, S-NSSAI 614, 616, 618, and 620. Each of the S-NSSAI 614, 616, 618, and 620 may include a number sequence corresponding to a network slice. For example, the S-NSSAI 614 may include a number sequence corresponding to the network slice 1 and indicate that the network slice 1 is supported by the cell 502 for the PLMN 1.

Referring back to FIG. 5, the UE 105 of the PLMN 1 may connect to the cell 510 and require an access to the network slice 1. The UE 105 may receive the local cell information 600 from the cell 510 and determines that the cell 510 does not support the network slice 1 for the PLMN 1. In such a case, the UE 105 may perform a cell reselection to connect to the cell 502 or 504.

Figure 7:
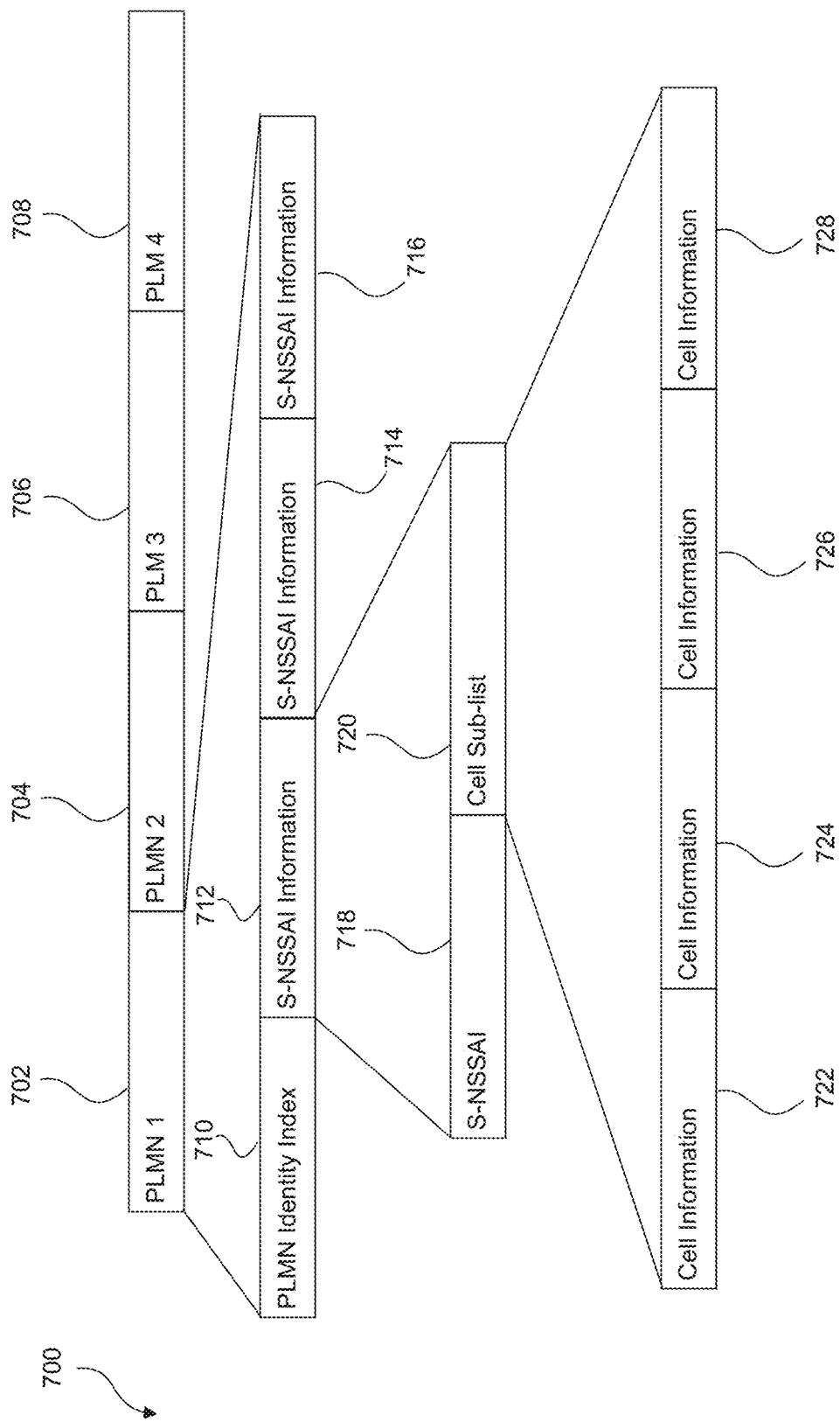
FIG. 7 illustrates an example of neighboring cells slices information according aspects of the disclosure.

FIG. 7 illustrates an example of neighboring cells slices information. According to some aspects, the neighboring cells slices information 700 may also be referred to as neighboring cells slice system information, a per PLMN per slice cell reselection data, or an SIB4 message. The neighboring cells slices information 700 may include, but is not limited to, PLMN 1 data 702, PLMN 2 data 704, PLMN 3 data 706, and PLMN 4 data 708. In some aspects, the PLMN 1 data 702 may include a PLMN identity index 710, s-NSSAI information 712, 714, and 716. The PLMN identity index 710 may be a sequence of digits identifying the PLMN 1. For example, the PLMN identity index 710 may be a five-digit or six-digit number corresponding to the PLMN 1. The S-NSSAI information 712 may include information of cells that support a network slice for the PLMN 1. For example, the S-NSSAI 712 may include an S-NSSAI 718 and a cell sub-list 720. The S-NSSAI 718 may include a number sequence corresponding to a network slice, such as the network slice 2. The cell sub-list 720 may include information of cells that support the network slice 2 for the PLMN 1. The cell sub-list 720 may include, but is not limited to, cell information 722, 724, 726, and 728. Each of the cell information 722, 724, 726, and 728 may include a frequency. For example, the cell information 722 may include the frequency F3 indicating that cells operating on the frequency F3 support the network slice 2 for the PLMN 1. In some aspects, the cell information 722, 724, 726, and 728 are ranked at least based on priorities. For example, the cell information 722 may have a highest priority and therefore ranks the highest.

Referring back to FIG. 5, the UE 105 of the PLMN 1 may connect to the cell 502 and require an access to the network slice 2. The UE 105 may receive the neighboring cells slices information 700 from the cell 502. First, because the PLMN 1 is the operator of the UE 105, the UE 105 may determine that the PLMN 1 data 702 is relevant because it includes the PLMN identity index 710 corresponding to the PLMN 1. Second, because the UE 105 requires the access to the network slice 2, the UE 105 may determine that the S-NSSAI information 712 is relevant because it includes the S-NSSAI 718 corresponding to the network slice 2. Third, the UE may determine to connect to cells that operate on the frequency F3 at least based on the cell information 722, which ranks the highest in the cell sub-list 720 of the S-NSSAI information 712. For example, the UE may determine to connect to the cell 510 that operates on the frequency F3.

Figure 8:
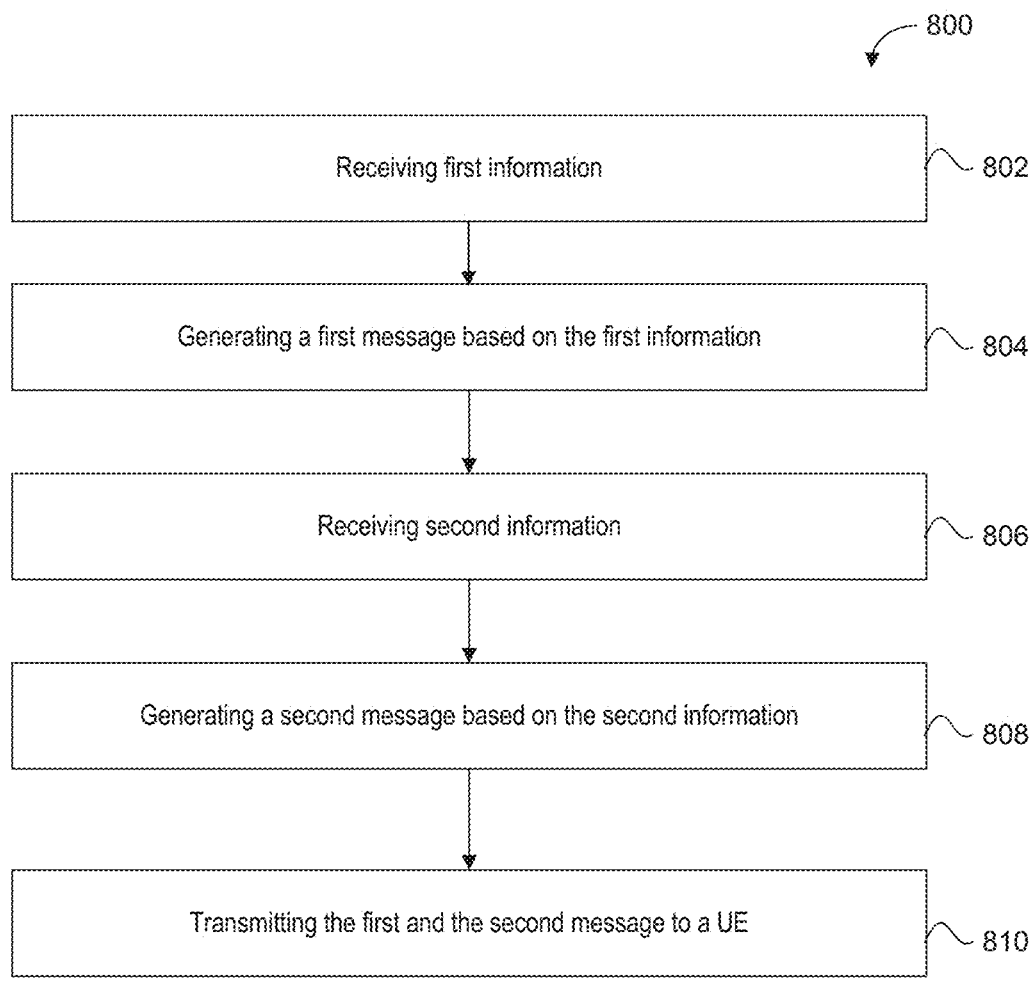
FIG. 8 illustrates an example method for a base station supporting a network slice based cell selection and/or reselection according aspects of the disclosure.

FIG. 8 illustrates an example method 800 for a base station supporting a network slice based cell selection and/or reselection. As a convenience and not a limitation, FIG. 8 may be described with regard to elements of FIGS. 1, 2, and 10. Method 800 may represent the operation of an electronic device (for example, the base stations 101, 109, and 113 of FIG. 1) implementing the RAN support of network slicing. Method 800 may also be performed by system 200 of FIG. 2 and/or computer system 1000 of FIG. 10. But method 800 is not limited to the specific aspects depicted in those figures and other systems may be used to perform the method, as will be understood by those skilled in the art. It is to be appreciated that not all operations may be needed, and the operations may not be performed in the same order as shown in FIG. 8.

At 802, a base station receives first information. The base station may receive the first information from a core network or one or more neighboring base stations. According to some aspects, the first information may include supported PLMN(s) in a local cell. For example, the base station 101 may receive the first information regarding supported PLMN(s) in the cell 103. The first information may indicate that the cell 103 supports a PLMN 1 and a PLMN 2. In some aspects, the base station may support one or more local cells. The first information may include supported PLMN(s) in each of the one or more local cells.

According to some aspects, the first information may include supported network slices in the local cell for PLMN(s). For example, the base station may receive the first information that indicates the cell 502 supports the network slice 2 for the PLMN 1 and supports the network slice 1 for the PLMN 1 and the PLMN 2. In some aspects, a plurality of cells may share the base station. For example, the cell 502 and the cell 506 may share the base station. The first information received by the base station may include network slice information of the cell 502 and the cell 506. For example, the first information may also indicate that the cell 506 supports the network slice 2 for the PLMN 2.

At 804, the base station may generate a first message at least based on the first information. According to some aspects, the first message may include supported PLMN(s) in the local cell. For example, the base station may be the base station 101 and the first message may indicate that the cell 103 supports the PLMN 1 and the PLMN 2. In some aspects, the base station may support one or more local cells. The first message may include supported PLMN(s) in each of the one or more local cells. In other aspects, the first message may include supported PLMN(s) in one of the one or more local cells.

According to some aspects, the first message may be the local cell information 600 or the SIB1 message 600. As shown in FIG. 6, the first message may include available network slices in the local cell for each PLMN. In some aspects, the base station may support one or more cells. For example, the base station may support both the cell 502 and the cell 506. The first message may include information of both the cell 502 and the cell 506. In other aspects, the base station may determine that the first message is intended to be transmitted to one or more UEs in the cell 502. In such as case, the first message may include information of the cell 502.

At 806, the base station may receive second information. The base station may receive the second information from a core network or one or more neighboring base stations. The second information may include supported PLMN(s) in neighboring cells. For example, the base station 101 may receive the second information that indicates supported PLMN(s) for the cell 115 and the cell 111.

According to some aspects, the second information may include supported PLMN(s) and corresponding network slices in neighboring cells. For example, the base station may support the cell 502 and the neighboring cells including the cells 504, 506, and 510. The second information may indicate that the cells 506 and 508 support the network slice 2 for the PLMN 2 and the cell 510 supports the network slice 2 for the PLMN 1.

At 808, the base station may generate a second message at least based on the second information. In some aspects, the second message may be the neighboring cells information 400 or the SIB4 message 400 shown in the FIG. 4. In other aspects, the second message may be the neighboring cells slices information 700 or the SIB4 message 700 shown in the FIG. 7.

At 810, the base station may transmit the first and the second message to a UE. According to some aspect, the base station may transmit the first and the second message to the UE that connects to the base station. For example, the base station 101 may transmit the first and the second message to the UE 105 via the link 107. In other aspects, the base station may broadcast the first and the second message to one or more UEs. For example, a base station of the cell 502 may broadcast the first and the second message in the frequency F1 to the one or more UEs.

Figure 9:
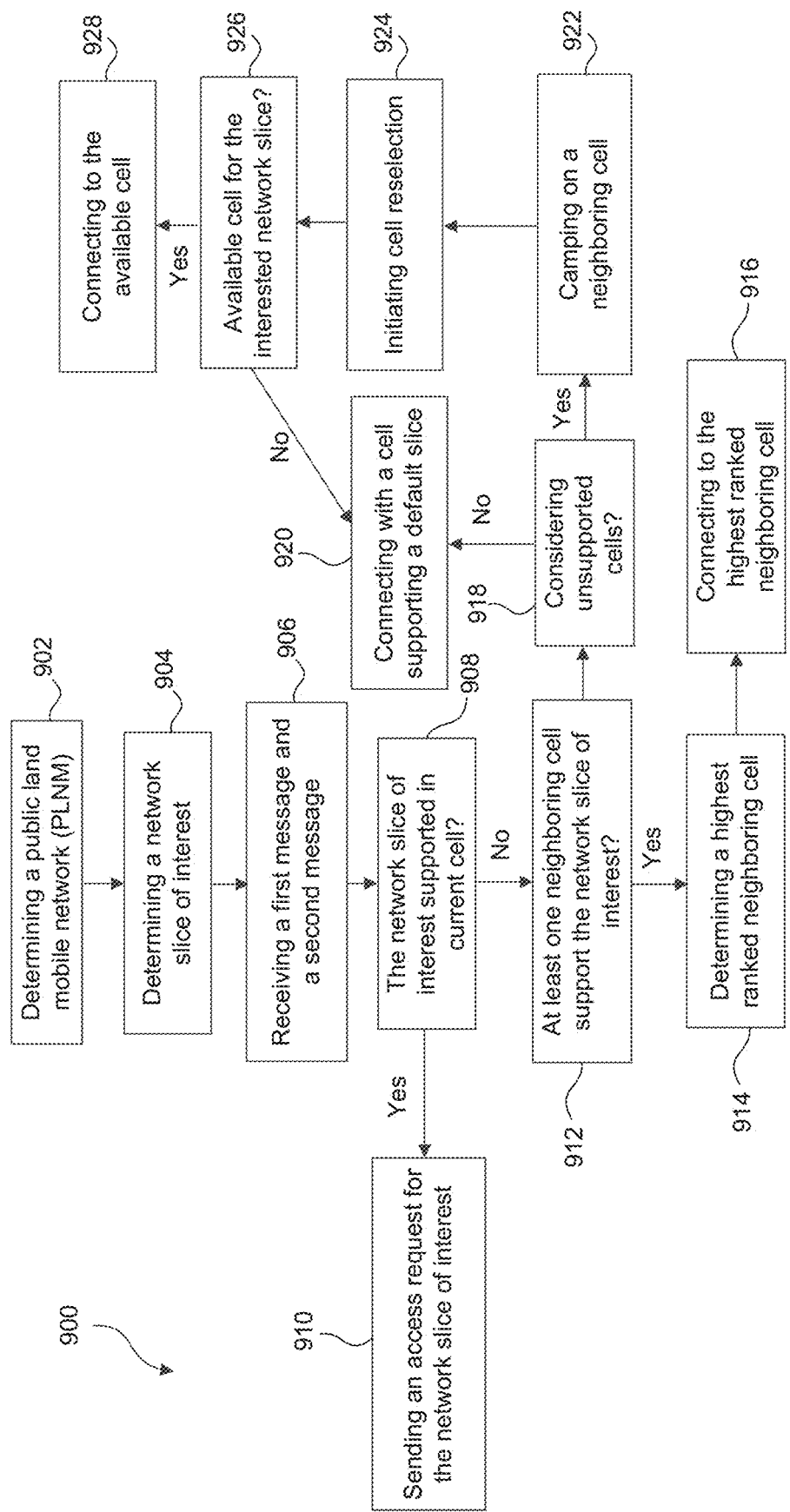
FIG. 9 illustrates an example method 900 for a UE performing a network slice based cell selection and/or reselection according aspects of the disclosure.

FIG. 9 illustrates an example method 90 for a UE performing a network slice based cell selection and/or reselection. As a convenience and not a limitation, FIG. 9 may be described with regard to elements of FIGS. 1, 2, and 10. Method 900 may represent the operation of an electronic device (for example, the UE 105 of FIG. 1) implementing RAN support of network slicing. Method 900 may also be performed by system 200 of FIG. 2 and/or computer system 1000 of FIG. 10. But method 900 is not limited to the specific aspects depicted in those figures and other systems may be used to perform the method, as will be understood by those skilled in the art. It is to be appreciated that not all operations may be needed, and the operations may not be performed in the same order as shown in FIG. 9.

At 902, the UE may determine a serving operator of the UE. In some aspects, the UE may determine its serving operator at least based on an IMSI of the UE. For example, the UE may determine the serving operator to be the PLMN 1. According to some aspects, the UE may include a subscriber identity module (SIM) card that stores the IMSI. The UE may obtain the IMSI by reading the SIM card.

At 904, the UE may determine a network slice of interest to the UE. According to some aspects, the UE may determine the network slice of interest based on a QoS requirement of the UE. For example, the UE may require a reliable and low latency service, such as a URLLC service. The UE may determine that a network slice providing URLLC service to be the network slice of interest. In some aspect, the UE may determine the network slice of interest based on a user input or a request from one or more applications of the UE.

At 906, the UE receives a first message and a second message. According to some aspects, the first message and the second message may correspond to the first message and the second message described in FIG. 8. For example, the first message and the second message may correspond to an SIB1 message and an SIB4 message, respectively. In some aspects, the UE may receive the first and the second message from a current connecting cell via a base station. For example, the UE 105 may receive the first and the second message from the cell 103 via the base station 101.

At 908, the UE may determine whether the network slice of interest is supported in the current connecting cell. According to some aspects, the UE may determine at least based on the first message, such as the SIB1 message 600 described in FIG. 6. The UE 105 may determine that the PLMN 1 data 602 is relevant based on the PLMN identity index 610. The UE may check the S-NSSAI list 612 of the PLMN 1 data 602 and determine if the network slice of interest is in the S-NSSAI list 612. If the network slice of interest is in the S-NSSAI list 612, the control moves to 910.

At 910, the UE may send an access request for the network slice of interest. According to some aspects, the UE may send the access request to the current connecting cell. For example, the UE 105 may send the access request to the cell 103 via the base station 101.

Referring back to 908, if the network slice of interest is not in the S-NSSAI list 612, the control moves to 912.

At 912, the UE may determine whether the network slice of interest is supported in at least one neighboring cell. According to some aspects, the UE may determine at least based on the second message. For example, the UE 105 may determine at least based on the SIB4 message 700 described in FIG. 7. The UE 105 may determine that the PLMN 1 data 702 is relevant based on the PLMN identity index 710. For example, the PLMN identity index 710 may correspond to the PLMN 1. The UE may determine that the S-NSSAI information 712 is relevant based on the S-NSSAI 718 because the S-NSSAI 718 may correspond to the network slice of interest. If the cell sub-list 720 include at least one cell information data, for example, the cell information 722, the UE may determine that the network slice is supported in at least one neighboring cell. The control moves to 914.

At 914, if the cell sub-list 720 includes more than one cell information data, the UE determines to use cell information data based on its rank. For example, the UE determines to use a highest ranked cell information data, such as the cell information 722. In some aspects, the cell information data in the cell sub-list 720 may be ranked based on priorities. For example, each of the cell information in the cell sub-list may include a priority value. The cell information 722 may include a first priority value. The UE may determine that the cell information 722 ranks the highest because the first priority value may is larger than priority values of any other cell information data in the cell sub-list 720.

According to some aspects, the cell information 722 may also include a frequency. The UE determines, at least based on the cell information 722, that neighboring cells operating on the frequency support the network slice of interest for the PLMN 1.

At 916, the UE may establish communication with a neighboring cell operating on the frequency. According to some aspects, the UE may transmit a connection request to the neighboring cell on the frequency to establish the communication. In some aspects, the UE may determine that more than one neighboring cells operate on the frequency. The UE may establish communication with a neighboring cell with a highest signal strength or a best channel quality.

Referring back to 912, the UE may determine that no neighboring cell supports the network slice of interest for the PLMN 1. For example, the UE may determine that the cell sub-list 720 is empty. Alternatively, the UE may determine that the S-NSSAI information 712, 714, and 716 do not correspond to the network slice of interest. For example, the UE may determine that the S-NSSAI 718 does not match the network slice of interest. In such a case, the control moves to 918.

At 918, the UE determines whether to consider cells that do not support the network slice of interest. The UE may determine at least based on control signals received from the base station or the core network. The UE may also determine based on a user input or a request from one or more applications of the UE. If the UE determines not to consider the cells that do not support the network slice of interest, the control moves to 920.

At 920, the UE may connect to a cell that supports a default network slice for the PLMN 1. According to some aspect, the default network slice may provide basic communication services to the UE. For example, the basic communication services may include, but are not limited to, voice/video communications, upload/download files, and web browsing. In some aspects, the default network slice provides eMBB service and the network slice of interest may provide URLLC service.

Referring back to 918, if the UE determines to consider the cells that do not support the network of interest, the control moves to 922.

At 922, the UE may camp on a first neighboring cell. In some aspects, the UE may access the default network slice when camping on the first neighboring cell. The UE may determine to camp on the first neighboring cell based on a signal strength of the neighboring cell. For example, the signal strength of the first neighboring cell may be larger than any other neighboring cells. In some aspects, the signal strength of the first neighboring cell may be lower than a threshold. The threshold may be used to prevent the UE from connecting to a neighboring cell that locates too close to the current connecting cell. In other aspects, the UE may determine to camp on the first neighboring cell based on a channel quality.

At 924, the UE may initiate a cell reselection based on the SIB4 message 700 receive from the first neighboring cell. According to some aspects, the UE may receive an SIB4 message 700 from the first neighboring cell when camping on the neighboring cell. In some aspects, the UE may also receive an SIB1 message 600 from the first neighboring cell.

At 926, the UE may determine whether at least one neighboring cell of the first neighboring cell support the network of interest for the PLMN 1 based on the SIB4 message 700 received from the first neighboring cell. According to some aspects, the neighboring cells described in 912 may be different from neighboring cells of the first neighboring cell. The neighboring cells described in 912 are close to the current connecting cell. In contrast, the neighboring cells of the first neighboring cell are close to the first neighboring cell. Because geolocations of the current connecting cell and the first neighboring cell may be different, the neighboring cells described in 912 may be different from the neighboring cells of the first neighboring cell.

Similar to 912, the UE may determine that at least one neighboring cell of the first neighboring cell support the network slice of interest, the control moves to 928.

At 928, the UE may establish communication with the at least on neighboring cell of the first neighboring cell. If more than one neighboring cells of the first neighboring cell supports the network slice of interest, the UE select one neighboring cell to connect as described in 914 and 916.

Referring back to 926, if the UE determines that no neighboring cell of the first neighboring cell supports the network slice of interest for the PLMN 1, the control moves to 920, which is described above. In some aspects, if the UE have access to the default network slice when connecting to the first neighboring cell, the UE may stay connected to the first neighboring cell.

Figure 10:
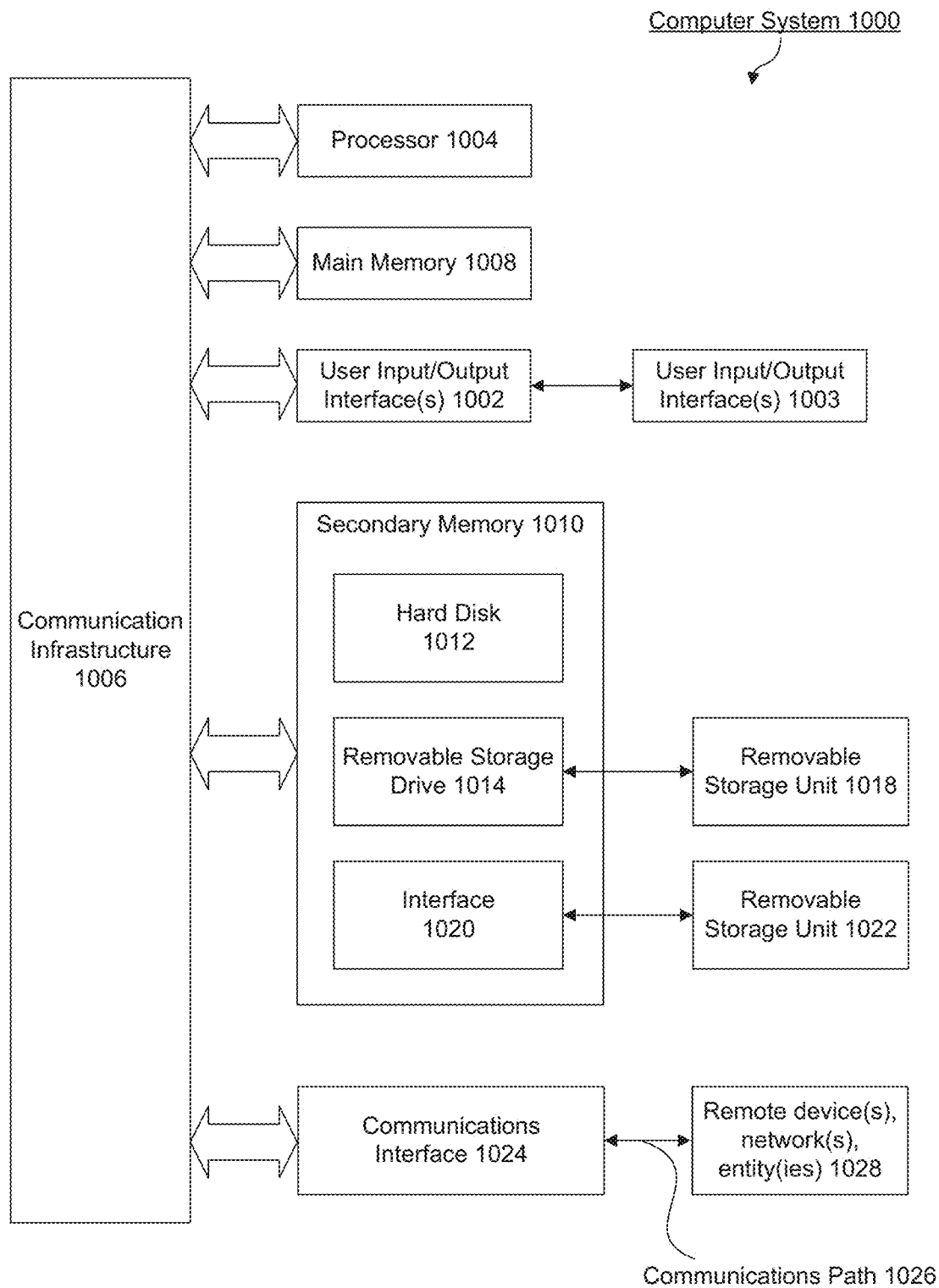
FIG. 10 is an example computer system for implementing some aspects of the disclosure or portion(s) thereof.

Various aspects may be implemented, for example, using one or more computer systems, such as computer system 1000 shown in FIG. 10. Computer system 1000 may be any well-known computer capable of performing the functions described herein such as devices 101, 105 of FIG. 1, or 200 of FIG. 2. Computer system 1000 includes one or more processors (also called central processing units, or CPUs), such as a processor 1004. Processor 1004 is connected to a communication infrastructure 1006 (e.g., a bus.) Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk. DVD, optical storage disk, and/any other computer data storage device. Removable storage drive 1014 reads from and/or writes to removable storage unit 1018 in a well-known manner.

According to some aspects, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

EXAMPLES

Example 1 may include a base station apparatus configured to support with a cell, comprising:
a transceiver configured to communicate with a user equipment (UE); and
a processor communicatively, coupled to the transceiver, and configured to:
generate a first message;
generate a second message; and
transmit, using the transceiver, the first message and the second message to the UE,
wherein the first message is associated with the cell and includes a first public land mobile network (PLMN) identity index and a first list of one or more network slices supported by a first PLMN associated with the first PLMN identity index,
wherein the second message is associated with one or more neighboring cells, and includes the first PLMN identity index and a second list of one or more network slice data associated the first PLMN as supported by the one or more neighboring cells, and
wherein at least one of the one or more network slice data in the second list includes a sub-list of one or more neighboring cell data.

Example 2 may include the base station of example 1 or some other example herein, wherein the first message is a system information block type 1 (SIB1) message.

Example 3 may include the base station of example 1 or some other example herein, wherein the second message is a system information block type 4 (SIB4) message.

Example 4 may include the base station of example 1 or some other example herein, wherein the first list includes single network slice selection assistance information (S-NSSAI) for each of the one or more network slices in the first list.

Example 5 may include the base station of example 1 or some other example herein, wherein each of the one or more network slice data in the second list further includes single network slice selection assistance information (S-NSSAI).

Example 6 may include the base station of example 1 or some other example herein, wherein each of the one or more neighboring cell data includes frequency information.

Example 7 may include the base station of example 1 or some other example herein, wherein the one or more neighboring cell data are ranked in the sub-list according to corresponding priorities.

Example 8 may include the base station of example 1 or some other example herein, wherein the first message further includes a second PLMN identity index and a third list of one or more network slices, wherein the first PLMN supports the one or more network slices in the first list, and wherein a second PLMN associated with the second PLMN identity index supports the one or more network slices in the third list.

Example 9 may include the base station of example 1 or some other example herein, wherein the second message includes a second PLMN identity index and a fourth list of one or more network slice data, wherein the first PLMN supports the one or more network slices in the second list, and wherein a second PLMN associated with the second PLMN identity index supports the one or more network slices in the fourth list.

Example 10 may include a method. The method comprises:
generating, by a base station, a first message;
generating, by the base station, a second message; and
transmitting, by the base station, the first message and the second message to a user equipment (UE),
wherein the first message is associated with a cell supported by the base station and includes a first public land mobile network (PLMN) identity index and a first list of one or more network slices,
wherein the second message is associated with one or more neighboring cells and includes the first PLMN identity index and a second list of one or more network slice data, and
wherein at least one of the one or more network slice data in the second list includes a sub-list of one or more neighboring cell data Example 11 may include the method of example 10 or some other example herein, wherein the first message is a system information block type 1 (SIB1) message.

Example 12 may include the method of example 10 or some other example herein, wherein the second message is a system information block type 4 (SIB4) message.

Example 13 may include the method of example 10 or some other example herein, wherein the first list includes single network slice selection assistance information (S-NSSAI) for each of the one or more network slices.

Example 14 may include the method of example 10 or some other example herein, wherein each of the one or more network slice data in the second list further includes single network slice selection assistance information (S-NSSAI).

Example 15 may include the method of example 10 or some other example herein, wherein each of the one or more neighboring cell data includes frequency information.

Example 16 may include the method of example 10 or some other example herein, wherein the one or more neighboring cell data are ranked in the sub-list according to corresponding priorities.

Example 17 may include the method of example 10 or some other example herein, wherein the first message further includes a second PLMN identity index and a third list of one or more network slices, wherein the a first PLMN associated with the first PLMN identity index supports the one or more network slices in the first list, and wherein a second PLMN associated with the second PLMN identity index supports the one or more network slices in the third list.

Example 18 may include the method of example 10 or some other example herein, wherein the second message includes a second PLMN identity index and a fourth list of one or more network slice data, wherein a first PLMN associated with the first PLMN identity index supports the one or more network slices in the second list, and wherein the second PLMN associated with the second PLMN identity index supports the one or more network slices in the fourth list.

Example 19 may include a user equipment (UE), comprising:
- a transceiver configured to communicate with a base station; and
- a processor communicatively coupled to the transceiver and configured to:
  - determine a public land mobile network (PLMN) serving the UE;
  - determine a network slice of interest;
  - receive, using the transceiver, a first message and a second message, wherein the first message is associated with a cell and includes a public land mobile network (PLMN) identity index associated with a PLMN and a first list of one or more network slices, wherein the second message is associated with one or more neighboring cells and includes the PLMN identity index, a second list of one or more network slice data, and wherein at least one of the one or more network slice data in the second list includes a sub-list of one or more neighboring cell data;
  - determine at least based on the first message that the network slice of interest is not supported by the PLMN in the cell;
  - determine at least based on the second message, neighboring cell data associated with the network slice of interest and the PLMN;
  - establish, using the transceiver, a communication link with a neighboring cell of the one or more neighboring cells at least based on the neighboring cell data; and
  - transmit, using the transceiver, a request to the neighboring cell to access the network slice of interest.

Example 20 may include the UE of example 19 or some other example herein, wherein the first message is a system information block type 1 (SIB1) message.

Example 21 may include the UE of example 19 or some other example herein, wherein the second message is a system information block type 4 (SIB4) message.

Example 22 may include the UE of example 19 or some other example herein, wherein the processor is further configured to determine at least based on the first message that the network slice of interest is not supported by determining that the network slice of interest is not in the first list of one or more network slices.

Example 23 may include the UE of example 19 or some other example herein, wherein the processor is further configured to determine at least based on the second message the neighboring cell data associated with the network slice of interest and the PLMN by: determining that the PLMN identity index corresponds to the PLMN; determining that the at least one of the one or more network slice data includes single network slice selection assistance information (S-NSSAI) corresponding to the network slice of interest, and determining that the neighboring cell data is in the sub-list.

Example 24 may include the UE of example 23 or some other example herein, wherein the processor is further configured to determine at least based on the second message the neighboring cell data associated with the network slice of interest and the PLMN by determining that the neighboring cell data ranks the highest in the sub-list at least based on priorities of the one or more neighboring cell data in the sub-list.

Example 25 may include the UE of example 19 or some other example herein, wherein the processor is further configured to establishing the communication link with the neighboring cell by communicating with the neighboring cell at least based on frequency information of the neighboring cell data.

Example 26 may include the UE of example 19 or some other example herein, wherein the request includes single network slice selection assistance information (S-NSSAI) corresponding to the network slice of interest.

Example 27 may include a method comprising:
- determining, by a user equipment (UE), a public land mobile network (PLMN) serving the UE, wherein the UE connects to a cell;
- determining, by the UE, an network slice of interest;
- receiving, by the UE, a first message and a second message, wherein the first message is associated with the cell and includes a public land mobile network (PLMN) identity index and a first list of one or more network slices, wherein the second message is associated with one or more neighboring cells and includes the PLMN identity index, a second list of one or more network slice data, and wherein at least one of the one or more network slice data in the second list includes a sub-list of one or more neighboring cell data;
- determining, by the UE, at least based on the first message that the network slice of interest is not supported by the PLMN in the cell;
- determining, by the UE, at least based on the second message, neighboring cell data associated with the network slice of interest and the PLMN;
- establishing, by the UE, a communication link with a neighboring cell of the one or more neighboring cells at least based on the neighboring cell data; and
- transmitting, by the UE, a request to the neighboring cell to access the network slice of interest.

Example 28 may include the method of example 27 or some other example herein, wherein the first message is a system information block type 1 (SIB1) message.

Example 29 may include the method of example 27 or some other example herein, wherein the second message is a system information block type 4 (SIB4) message.

Example 30 may include the method of example 27 or some other example herein, wherein determining at least based on the first message that the network slice of interest is not supported further comprising determining that the network slice of interest is not in the first list of one or more network slices.

Example 31 may include the method of example 27 or some other example herein, wherein determining at least based on the second message the neighboring cell data associated with the network slice of interest and the PLMN further comprising: determining that the PLMN identity index corresponds to the PLMN; determining that the at least one of the one or more network slice data includes single network slice selection assistance information (S-NS- SAI) corresponding to the network slice of interest, and determining that the neighboring cell data is in the sub-list.

Example 32 may include the method of example 31 or some other example herein, wherein determining at least based on the second message the neighboring cell data associated with the network slice of interest and the PLMN further comprising determining that the neighboring cell data ranks the highest in the sub-list at least based on priorities of the one or more neighboring cell data in the sub-list.

Example 33 may include the method of example 27 or some other example herein, wherein establishing the communication link with the neighboring cell comprising communicating with the neighboring cell at least based on frequency information of the neighboring cell data.

Example 34 may include the method of example 27 or some other example herein, wherein the request includes single network slice selection assistance information (S-NSSAI) corresponding to the network slice of interest.

Example 35 may include a user equipment (UE), comprising:
 a transceiver configured to communicate with a base station; and
 a processor communicatively coupled to the transceiver and configured to:
  determine a public land mobile network (PLMN) serving the UE;
  determine a network slice of interest;
  receive, using the transceiver, a first message wherein the first message is associated with a cell and includes a public land mobile network (PLMN) identity index associated with the PLMN and a first list of one or more network slices;
  determine at least based on the first message that the network slice of interest is not supported by the PLMN in the cell;
  receive, using the transceiver, a second message, wherein the second message is associated with a neighboring cell and includes the public land mobile network (PLMN) identity index associated with the PLMN and a second list of one or more network slices;
  determine at least based on the second message, the second list of one or more network slices includes the network slice of interest;
  establish, using the transceiver, a communication link with the neighboring cell; and
  transmit, using the transceiver, a request to the neighboring cell to access the network slice of interest.

Example 36 may include the UE of example 35 or some other example herein, wherein the first message is a system information block type 1 (SIB1) message.

Example 37 may include the UE of example 35 or some other example herein, wherein the second message is a system information block type 1 (SIB1) message.

Example 38 may include the UE of example 35 or some other example herein, wherein the processor is further configured to determine at least based on the first message that the network slice of interest is not supported by determining that the network slice of interest is not in the first list of one or more network slices.

Example 39 may include the UE of example 35 or some other example herein, wherein the request includes single network slice selection assistance information (S-NSSAI) corresponding to the network slice of interest.

Example 40 may include a base station apparatus configured to support with a cell, comprising:
 a transceiver configured to communicate with a user equipment (UE); and
 a processor communicatively, coupled to the transceiver, and configured to:
  generate a first message;
  transmit, using the transceiver, the first message to the UE,
  wherein the first message is associated with one or more neighboring cells, and includes the first PLMN identity index and a second list of one or more network slice data associated the first PLMN as supported by the one or more neighboring cells, and
  wherein at least one of the one or more network slice data in the second list includes a sub-list of one or more neighboring cell data.

Example 41 may include the base station of example 40 or some other example herein, wherein the processor is further configured to:
 generate a second message; and
 transmit, using the transceiver, the second message to the UE,
 wherein the second message is associated with the cell and includes a first public land mobile network (PLMN) identity index and a first list of one or more network slices supported by a first PLMN associated with the first PLMN identity index.

Example 42 may include a user equipment (UE), comprising:
 a transceiver configured to communicate with a base station; and
 a processor communicatively coupled to the transceiver and configured to:
  determine a public land mobile network (PLMN) serving the UE;
  determine a network slice of interest;
  receive, using the transceiver, a first message wherein the first message is associated with one or more neighboring cells and includes the PLMN identity index, a first list of one or more network slice data, and wherein at least one of the one or more network slice data in the first list includes a sub-list of one or more neighboring cell data;
  determine at least based on the first message that at least one neighboring cell of the one or more neighboring cells is preferred for the network slice of interest for the PLMN;
  establish, using the transceiver, a communication link with the neighboring cell; and
  transmit, using the transceiver, a request to the neighboring cell to access the network slice of interest.

Example 43 may include the UE of example 42 or some other example herein, wherein the processor is further configured to determine at least based on the first message that the at least one neighboring cell of the one or more neighboring cells is preferred for the network slice of interest for the PLMN by:
 determining that the PLMN identity index corresponds to the PLMN;
 determining that the at least one of the one or more network slice data includes single network slice selection assistance information (S-NSSAI) corresponding to the network slice of interest, and
 determining that the at least one neighboring cell is in the sub-list
 determining that the at least one neighboring cell ranks the highest in the sub-list based on priorities.

Example 44 may include a user equipment (UE), comprising:
a transceiver configured to communicate with a base station; and
a processor communicatively coupled to the transceiver and configured to:
determine a public land mobile network (PLMN) serving the UE;
determine a network slice of interest;
receive, using the transceiver, a first message wherein the first message is associated with one or more neighboring cells and includes a PLMN identity index, a first list of one or more network slice data, and wherein at least one of the one or more network slice data in the first list includes a sub-list of one or more neighboring cell data;
determine at least based on the first message that at least one neighboring cell of the one or more neighboring cells is preferred for the network slice of interest for the PLMN;
establish, using the transceiver, a communication link with the neighboring cell; and
transmit, using the transceiver, a request to the neighboring cell to access the network slice of interest.

Example 45 may include the UE of example 43 or some other example herein, wherein the processor is further configured to determine at least based on the first message that the at least one neighboring cell of the one or more neighboring cells is preferred for the network slice of interest for the PLMN by:
determining that the PLMN identity index corresponds to the PLMN;
determining that the at least one of the one or more network slice data includes single network slice selection assistance information (S-NSSAI) corresponding to the network slice of interest, and
determining that the at least one neighboring cell is in the sub-list
determining that the at least one neighboring cell ranks the highest in the sub-list based on priorities.

Example 46 may include the UE of example 43 or some other example herein, wherein the processor is further configured to:
receive, using the transceiver, a second message, wherein the second message is associated with a cell and includes the public land mobile network (PLMN) identity index associated with the PLMN and a second list of one or more network slices; and
determine at least based on the second message that the network slice of interest is not supported by the PLMN in the cell.

Example 47 may include the UE of example 46 or some other example herein, wherein the processor is further configured to determine at least based on the second message that the network slice of interest is not supported by determining that the network slice of interest is not in the second list of one or more network slices.

Example 48 may include the UE of example 46 or some other example herein, wherein the first message is a system information block type 4 (SIB4) message, and wherein the second message is a system information block type 1 (SIB1) message.

What is claimed is:

1. A base station apparatus configured to support wireless communication within a cell, comprising:
a transceiver configured to enable wireless communication with a user equipment (UE); and
a processor, communicatively coupled to the transceiver, and configured to:
generate a first message; and
transmit, using the transceiver, the first message to the UE,
wherein the first message includes a first public land mobile network (PLMN) identity index corresponding to a first PLMN supported by the cell, and a first list of one or more network slices supported by the first PLMN,
wherein the first message further includes a second PLMN identity index and a second list of one or more network slices,
wherein the first PLMN supports the one or more network slices in the first list, and
wherein a second PLMN associated with the second PLMN identity index supports the one or more network slices in the second list.

2. The base station apparatus of claim 1, wherein the processor is further configured to:
generate a second message; and
transmit, using the transceiver, the second message to the UE,
wherein the second message is associated with one or more neighboring cells, and includes the first PLMN identity index and a third list of one or more network slice data associated the first PLMN as supported by the one or more neighboring cells, and
wherein at least one of the one or more network slice data in the third list includes a sub-list of one or more neighboring cell data.

3. The base station apparatus of claim 1, wherein the first message is a system information block type 1 (SIB1) message, and wherein the first list includes single network slice selection assistance information (S-NSSAI) for each of the one or more network slices in the first list.

4. The base station apparatus of claim 2, wherein the second message is a system information block type 4 (SIB4) message, and wherein each of the one or more network slice data in the second third list further includes single network slice selection assistance information (S-NSSAI).

5. The base station apparatus of claim 2, wherein each of the one or more neighboring cell data includes frequency information, and wherein the one or more neighboring cell data are ranked in the sub-list according to corresponding priorities.

6. The base station apparatus of claim 2,
wherein the second message includes a third PLMN identity index and a fourth list of one or more network slice data,
wherein the first PLMN supports the one or more network slices in the third list, and
wherein a third PLMN associated with the third PLMN identity index supports the one or more network slices in the fourth list.

7. A user equipment (UE), comprising:
a transceiver configured to enable wireless communication with a base station; and
a processor, communicatively coupled to the transceiver, and configured to:
determine a public land mobile network (PLMN) serving the UE via a cell associated with the base station;
determine a network slice of interest to the UE;
receive, using the transceiver, a first message that includes a PLMN identity index corresponding to the PLMN and a first list of one or more network slices supported by the PLMN; and determine, based at least on the first message, that the network slice of interest is not supported by the PLMN in the cell;

receive, using the transceiver, a second message, wherein the second message is associated with a neighboring cell and includes the PLMN identity index corresponding to the PLMN and a second list of one or more network slices supported by the PLMN in the neighboring cell;

determine, based at least on the second message, that the network slice of interest is supported by the PLMN in the neighboring cell;

establish, using the transceiver, a communication link with the neighboring cell; and transmit, using the transceiver, a request to the neighboring cell to access the network slice of interest.

8. The UE of claim 7, wherein the first message is a system information block type 1 (SIB1) message, and wherein the second message is a SIB1 message.

9. The UE of claim 7, wherein the processor is further configured to determine at least based on the first message that the network slice of interest is not supported by determining that the network slice of interest is not in the first list of one or more network slices.

10. A base station apparatus configured to support wireless communication within a cell, comprising:

a transceiver configured to enable wireless communication with a user equipment (UE); and a processor, communicatively coupled to the transceiver, and configured to:

generate a first message; and transmit, using the transceiver, the first message to the UE, wherein the first message is associated with one or more neighboring cells, and includes a first public land mobile network (PLMN) identity index corresponding to a first PLMN and a first list of one or more network slice data associated the first PLMN as supported by the one or more neighboring cells, and wherein at least one of the one or more network slice data in the first list includes a sub-list of one or more neighboring cell data, and wherein each of the one or more neighboring cell data includes frequency information, and wherein the one or more neighboring cell data are ranked in the sub-list according to corresponding priorities.

11. The base station apparatus of claim 10, wherein the processor is further configured to:

generate a second message; and transmit, using the transceiver, the second message to the UE, wherein the second message is associated with the cell and includes the first PLMN identity index and a second list of one or more network slices supported by the first PLMN.

12. The base station apparatus of claim 11, wherein the second message is a system information block type 1 (SIB1) message, and wherein the second list includes single network slice selection assistance information (S-NSSAI) for each of the one or more network slices in the second list.

13. The base station apparatus of claim 10, wherein the first message is a system information block type 4 (SIB4) message, and wherein each of the one or more network slice data in the first list further includes single network slice selection assistance information (S-NSSAI).

14. A user equipment (UE), comprising:

a transceiver configured to enable wireless communication with a base station; and a processor, communicatively coupled to the transceiver, and configured to:

determine a public land mobile network (PLMN) serving the UE;

determine a network slice of interest to the UE;

receive, using the transceiver, a first message wherein the first message is associated with one or more neighboring cells and includes a PLMN identity index, a first list of one or more network slice data, and wherein at least one of the one or more network slice data in the first list includes a sub-list of one or more neighboring cell data;

determine, based at least on the first message, that a neighboring cell of the one or more neighboring cells is preferred for the network slice of interest for the PLMN;

establish, using the transceiver, a communication link with the neighboring cell;

transmit, using the transceiver, a request to the neighboring cell to access the network slice of interest;

receive, using the transceiver, a second message, wherein the second message is associated with a cell that serves the UE and includes the PLMN identity index corresponding to the PLMN and a second list of one or more network slices; and determine, based at least on the second message, that the network slice of interest is not supported by the PLMN in the cell.

15. The UE of claim 14, wherein the processor is further configured to:

determine that the PLMN identity index corresponds to the PLMN;

determine that the at least one of the one or more network slice data includes single network slice selection assistance information (S-NSSAI) corresponding to the network slice of interest;

determine that the neighboring cell is in the sub-list; and determine that the neighboring cell is preferred based on a corresponding priority rank in the sub-list for the neighboring cell.

16. The UE of claim 14, wherein the processor is further configured to determine the network slice of interest is not in the second list of one or more network slices.

17. The UE of claim 14, wherein the first message is a system information block type 4 (SIB4) message, and wherein the second message is a system information block type 1 (SIB1) message.

18. The base station apparatus of claim 11, wherein the second message includes a second PLMN identity index and a third list of one or more network slice data, wherein the first PLMN supports the one or more network slices in the second list, and wherein a second PLMN associated with the second PLMN identity index supports the one or more network slices in the third list.

19. The UE of claim 14, wherein to determine, based at least on the second message, that the network slice of interest is not supported by the PLMN in the cell, the processor is further configured to determine that the network slice of interest is not in the second list of one or more network slices.

20. The UE of claim 14, wherein the first message is a system information block type 1 (SIB1) message, and wherein the second message is a SIB1 message.

* * * * *

UNITED STATES PATENT AND TRADEMARK OFFICE
CERTIFICATE OF CORRECTION

| | |
|---|---|
| PATENT NO. | : 12,245,140 B2 |
| APPLICATION NO. | : 17/440441 |
| DATED | : March 4, 2025 |
| INVENTOR(S) | : Xu et al. |

It is certified that error appears in the above-identified patent and that said Letters Patent is hereby corrected as shown below:

In the Claims

In Column 28, Claim 4, Line 40, after "the" delete "second".

Signed and Sealed this
Thirteenth Day of May, 2025

Coke Morgan Stewart
*Acting Director of the United States Patent and Trademark Office*